(12) United States Patent
Douglas et al.

(10) Patent No.: US 8,612,569 B2
(45) Date of Patent: Dec. 17, 2013

(54) METHOD AND SYSTEM FOR PROXY TRACKING OF THIRD PARTY INTERACTIONS

(75) Inventors: Daniel Graham Douglas, Los Gatos, CA (US); Arnold J. Goldberg, Saratoga, CA (US); Aaron K. Forth, San Francisco, CA (US); Joseph D. McCaffery, Fremont, CA (US)

(73) Assignee: eBay Inc., San Jose, CA (US)

( * ) Notice: Subject to any disclaimer, the term of this patent is extended or adjusted under 35 U.S.C. 154(b) by 1136 days.

(21) Appl. No.: 11/637,641

(22) Filed: Dec. 12, 2006

(65) Prior Publication Data
US 2007/0168506 A1    Jul. 19, 2007

Related U.S. Application Data

(60) Provisional application No. 60/749,732, filed on Dec. 12, 2005.

(51) Int. Cl.
*G06F 15/173* (2006.01)

(52) U.S. Cl.
USPC .......................... 709/224; 709/225; 709/223

(58) Field of Classification Search
USPC .................. 709/223, 224, 225; 370/241, 252
See application file for complete search history.

(56) References Cited

U.S. PATENT DOCUMENTS

| | | | | |
|---|---|---|---|---|
| 7,069,249 | B2 * | 6/2006 | Stolfo et al. ..................... | 705/74 |
| 2002/0103664 | A1 * | 8/2002 | Olsson et al. ..................... | 705/1 |
| 2003/0046385 | A1 * | 3/2003 | Vincent .......................... | 709/224 |
| 2004/0002903 | A1 * | 1/2004 | Stolfo et al. ..................... | 705/26 |
| 2004/0260615 | A1 * | 12/2004 | Phillips et al. .................. | 705/26 |
| 2005/0050097 | A1 * | 3/2005 | Yeh et al. ..................... | 707/104.1 |
| 2005/0160002 | A1 * | 7/2005 | Roetter et al. .................. | 705/14 |
| 2006/0036459 | A1 * | 2/2006 | Desai et al. ....................... | 705/1 |
| 2006/0053050 | A1 * | 3/2006 | Schweier ....................... | 705/14 |

OTHER PUBLICATIONS

"Squid Frequently Asked Questions", http://www.squid-cache.org/Doc/FAQ/FAQ.html, (2004), 187 pgs.

Berners-Lee, T, "Hypertext Transfer Protocol—HTTP/1.0", http://www.ietf.org/rfc/rfc1945.txt, (May 1996), 57 pgs.

Fielding, R., et al., "Hypertext Transfer Protocol—HTTP/1.1", http://www.ietf.org/rfc/rfc2068.txt, "Obsoleted by [5], but this draft contains a description of the Keep-Alive response header.", (Jan. 1997), 152 pgs.

Fielding, R., et al., "Hypertext Transfer Protocol—HTTP/1.1", http://www.w3.org/Protocols/rfc2616/rfc2616.html, (Jun. 1999), 6 pgs.

Kristol, D., "HTTP State Management Mechanism", http://www.ietf.org/rfc/rfc2109.txt, (Feb. 1997), 20 pgs.

* cited by examiner

*Primary Examiner* — Umar Cheema
(74) *Attorney, Agent, or Firm* — Schwegman Lundberg & Woessner, P.A.

(57) ABSTRACT

A computer-implemented method and system is operable to: receive a tracking event from a client, recognize tracking specific parameters in the tracking event, generate a tracking entry corresponding to the tracking event, use a tracking service API to send the tracking entry to a second server, and redirect the client to an intended target corresponding to the tracking event.

9 Claims, 18 Drawing Sheets

US 8,612,569 B2

METHOD AND SYSTEM FOR PROXY TRACKING OF THIRD PARTY INTERACTIONS

CROSS-REFERENCE TO RELATED PATENT APPLICATION

This patent application claims the benefit of the filing date of U.S. Provisional Patent Application Ser. No. 60/749,732, filed Dec. 12, 2005, and entitled, "METHOD AND SYSTEM FOR PROXY TRACKING OF THIRD PARTY INTERACTIONS".

BACKGROUND

1. Technical Field

This disclosure relates to methods and systems supporting online consumer interactions by a user in a networked system.

2. Related Art

Conventional network-based marketplaces (e.g. consumer websites) provide users with functionality to browse a collection of items (e.g. goods or services) at a website and to make purchases using a variety of means. In some cases, users merely search for items using a natural search entry. In other cases, users click on links provided in paid advertising. Usually, affiliates and/or a publication system provide some added value that enables users to quickly access a merchant site associated with a searched item or an advertisement. In most cases, links are provided so users can click through to a merchant site. It is necessary to keep a record of these user clicks so that the affiliates and/or advertisers can be properly credited for the user click throughs. However, conventional systems for tracking these click events are flawed. The widespread use of anti-spyware blocking software can prevent accurate tracking of the use of the site. Natural search tracking issues can cause inaccurate payouts for affiliates. Conventional systems cause numerous connections and redirects to external third party sites from clients. The lengthy redirect chain increases the likelihood of a single outage blocking off a portion of desired traffic. These and other problems have made the conventional tracking systems inefficient.

BRIEF DESCRIPTION OF THE DRAWINGS

Embodiments illustrated by way of example and not limitation in the figures of the accompanying drawings, in which.

Figure 3:
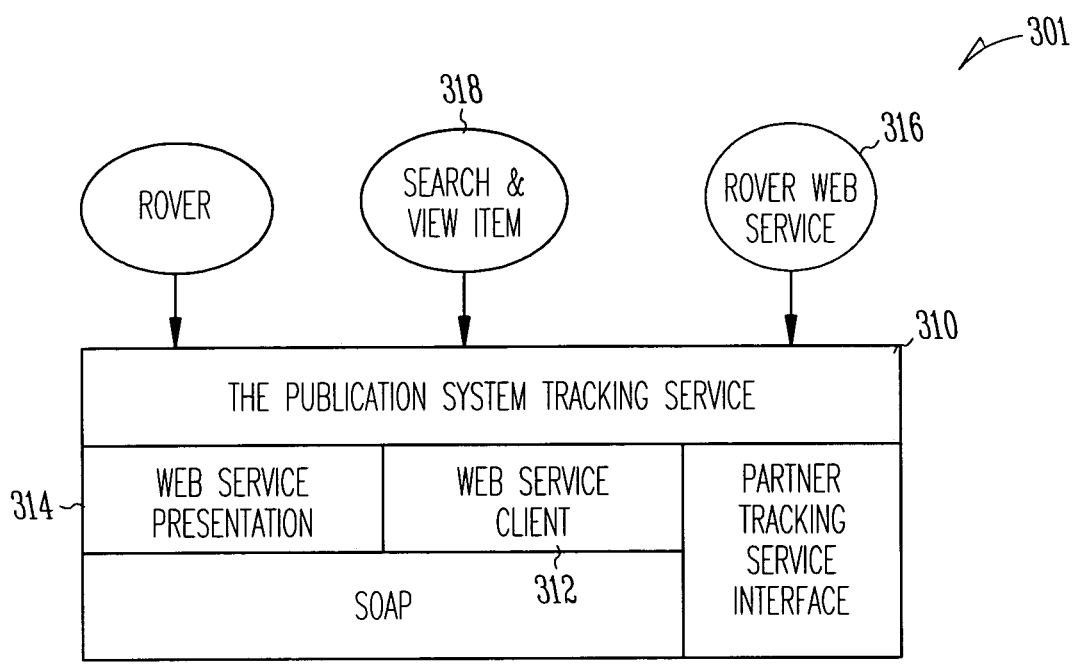

An architectural overview of an example embodiment is shown in FIG. 3.

Figure 4:
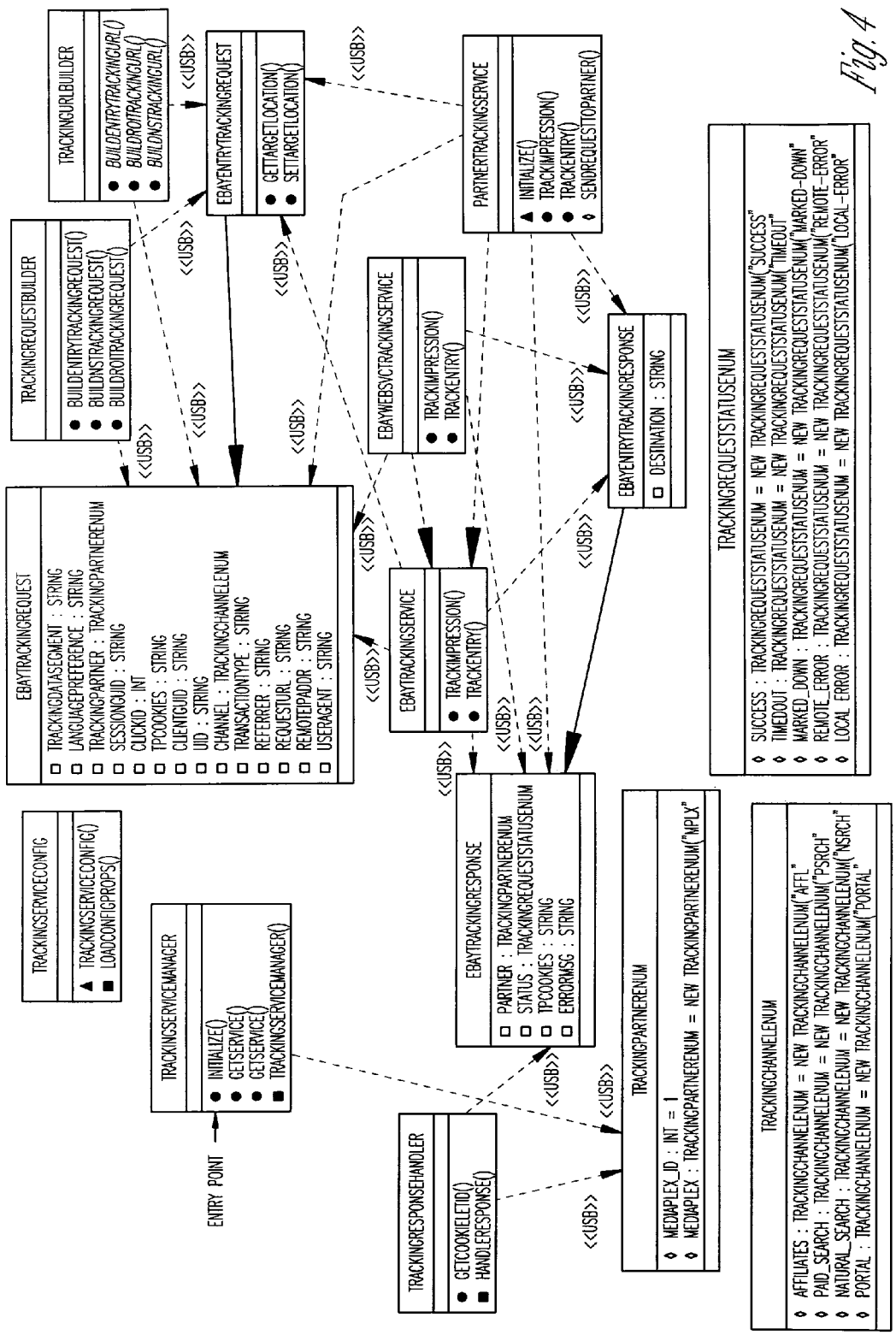

A UML (unified modeling language) diagram illustrated in FIG. 4 presents an overview of the Java API in an example embodiment.

Figure 5:
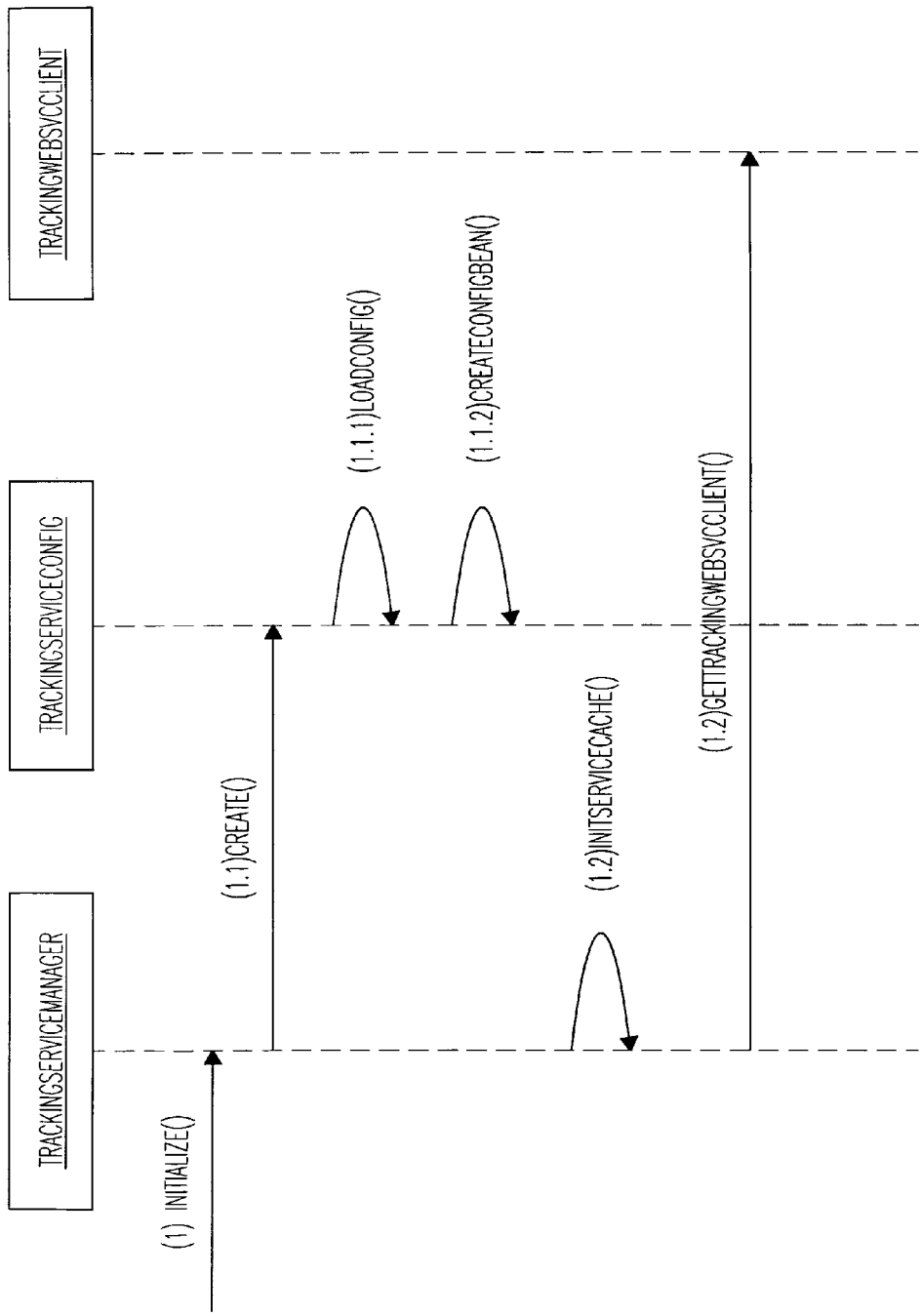

A TrackingServiceManager initialization sequence diagram of an example embodiment is illustrated in FIG. 5.

Figure 6:
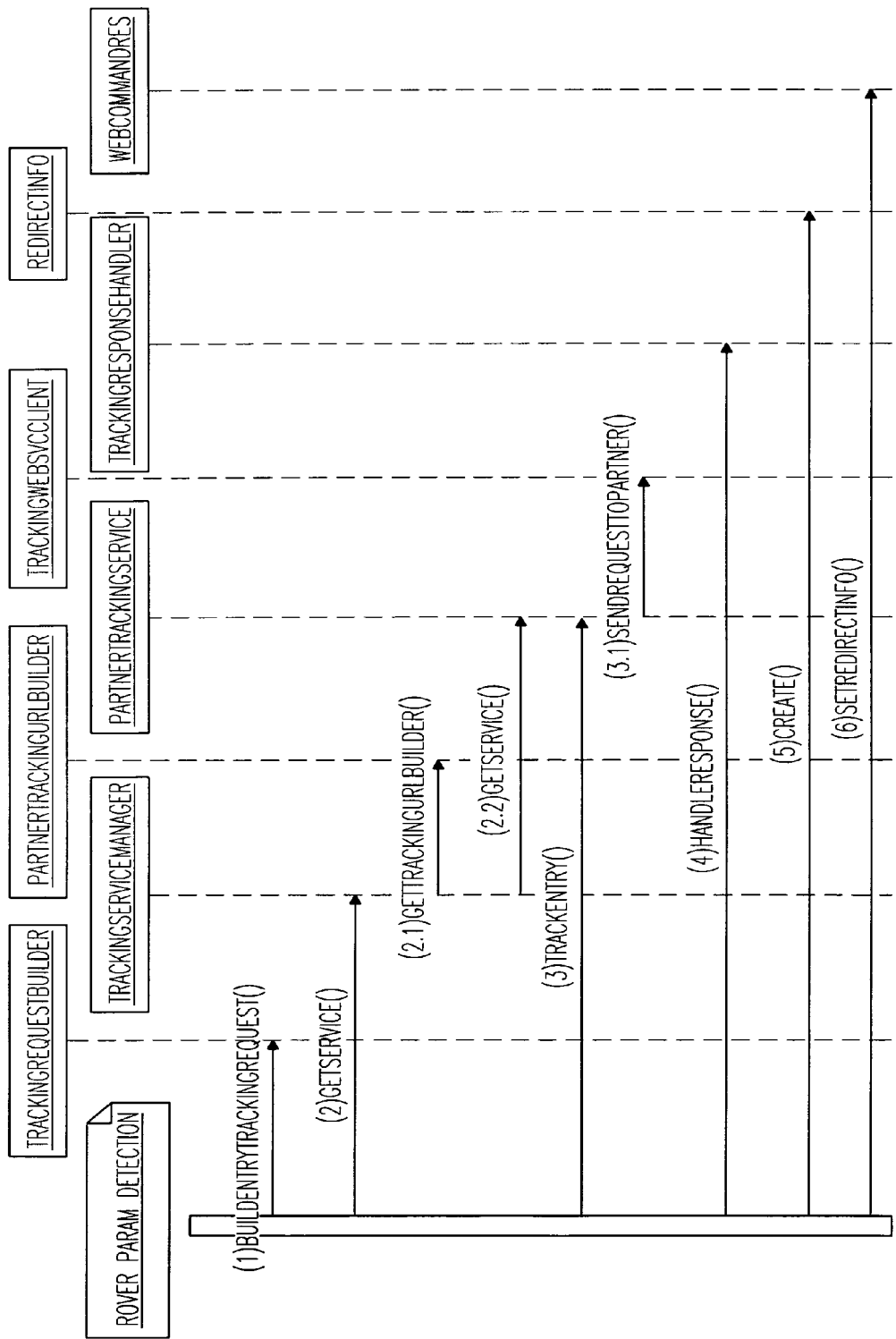

A Tracking partner connection parameter (param) detection sequence diagram of an example embodiment is illustrated in FIG. 6.

Figure 7:
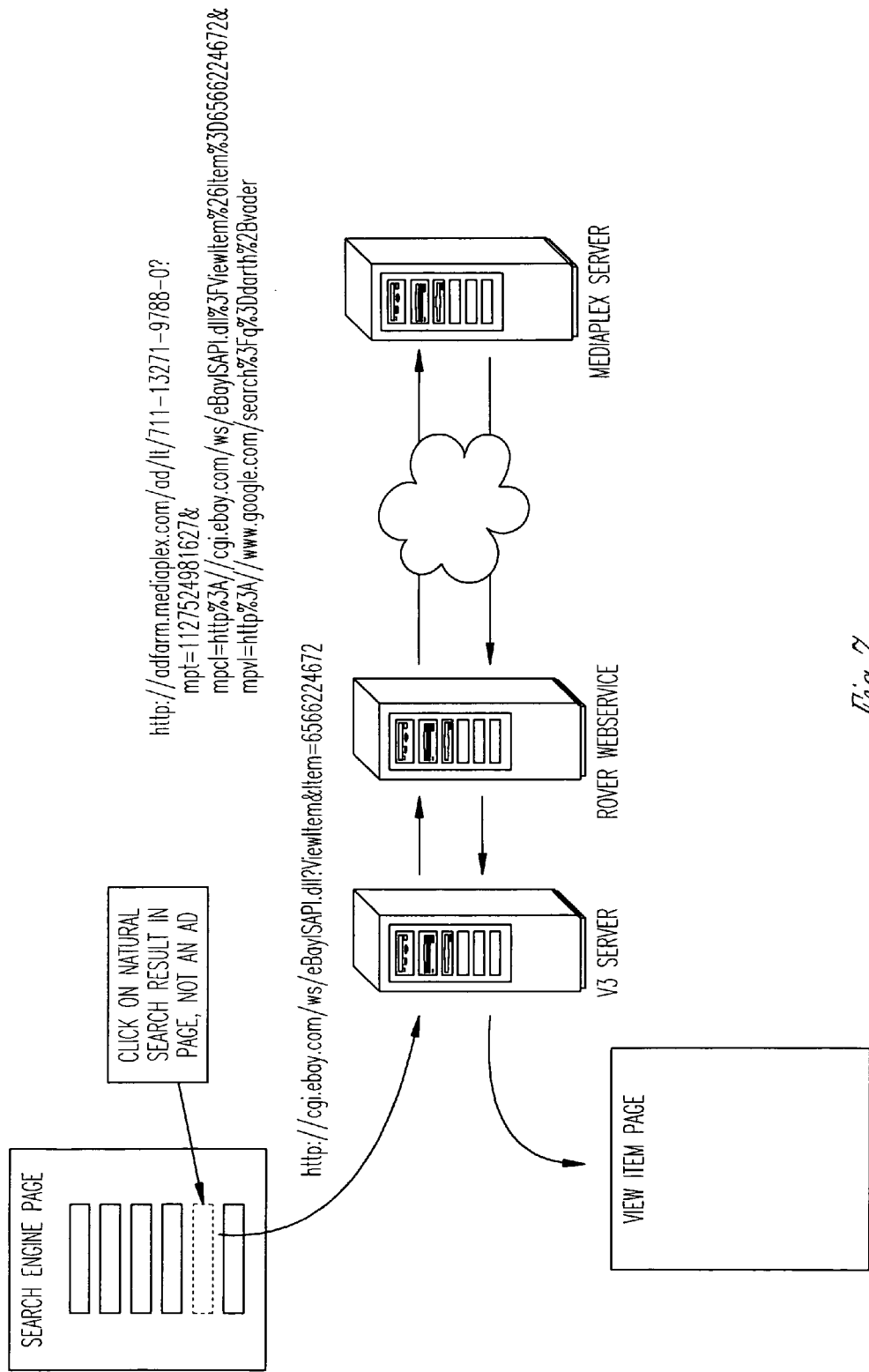

FIG. 7 illustrates a system for natural search entry detection in an example embodiment.

Figure 8:
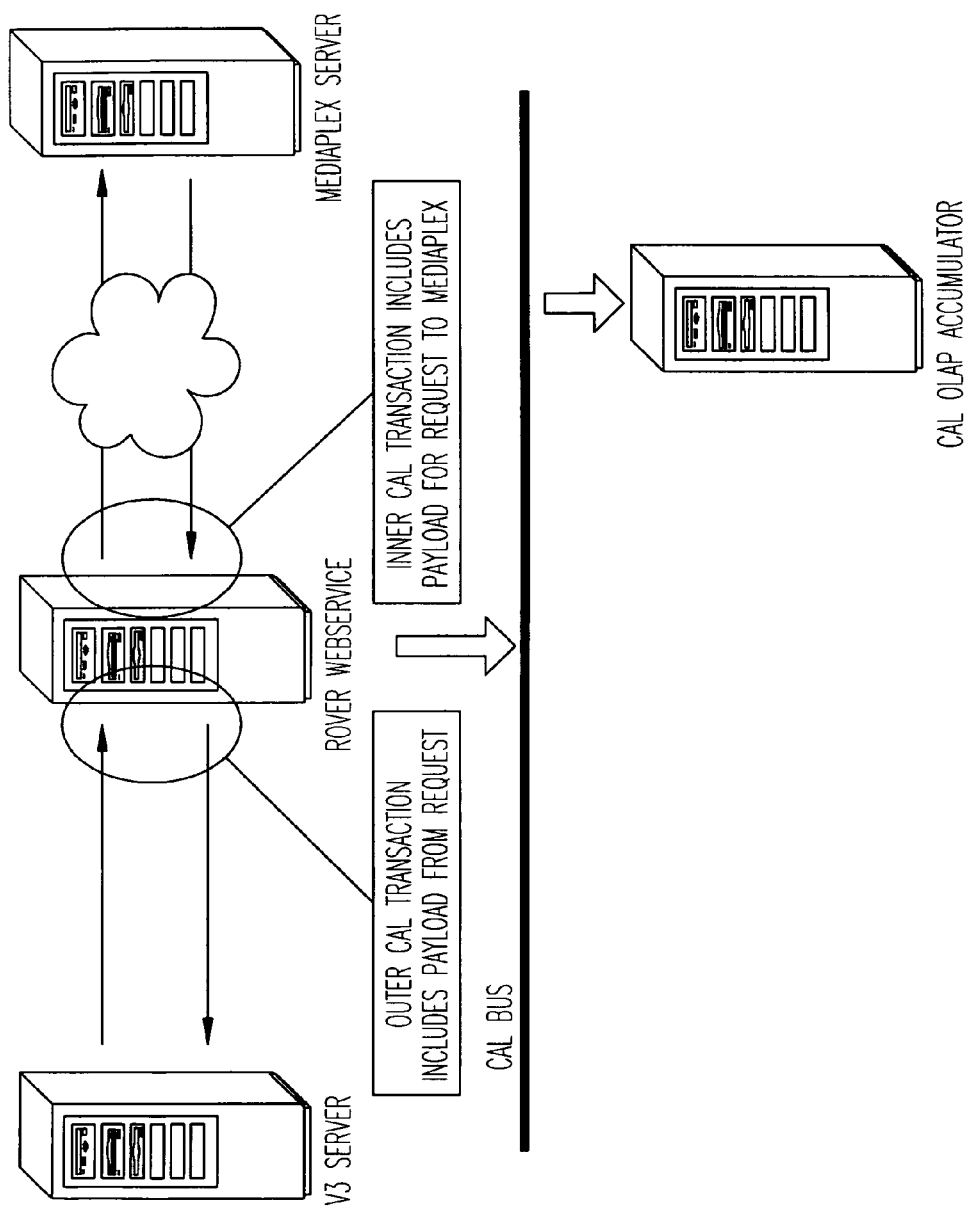

FIG. 8 illustrates the reporting and alerting system in one embodiment.

Figure 9:
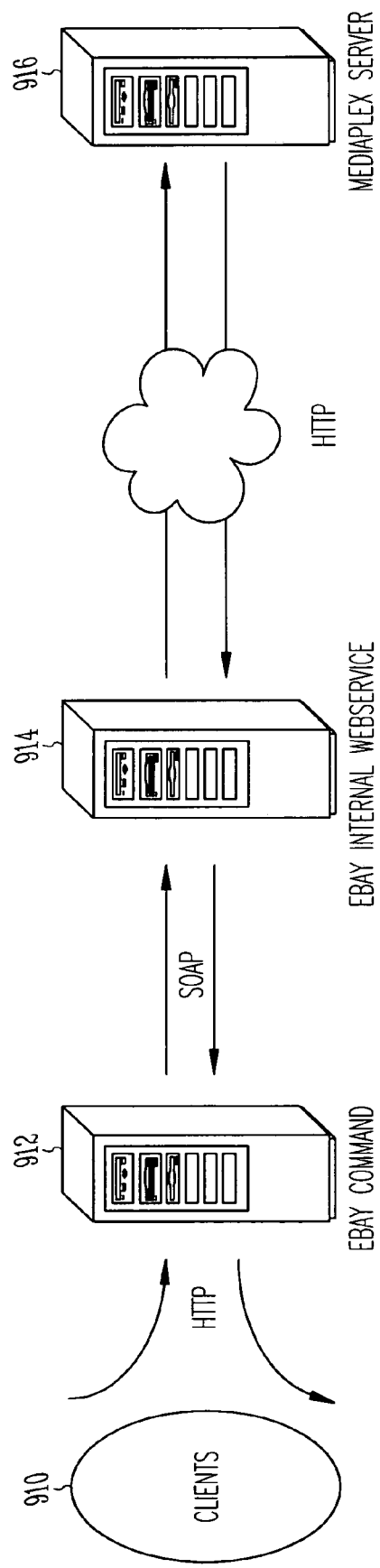

FIG. 9 illustrates a configuration, in an example embodiment, for handling all the calls to an advertising server from a publication system server.

Figure 10:
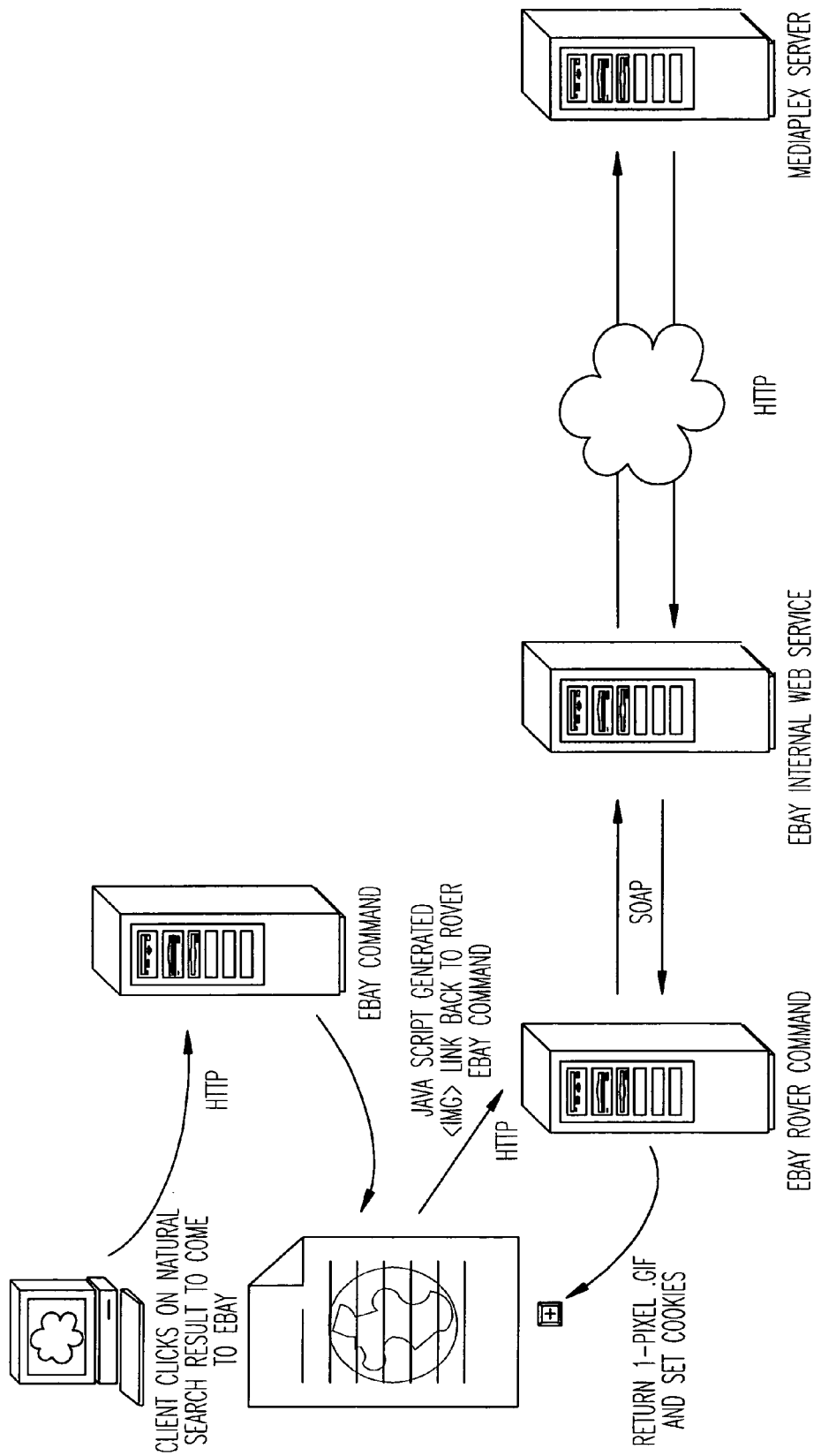

FIG. 10 illustrates natural search entry detection on any page served by the publication system with JavaScript running on the page, in an example embodiment.

Figure 11:
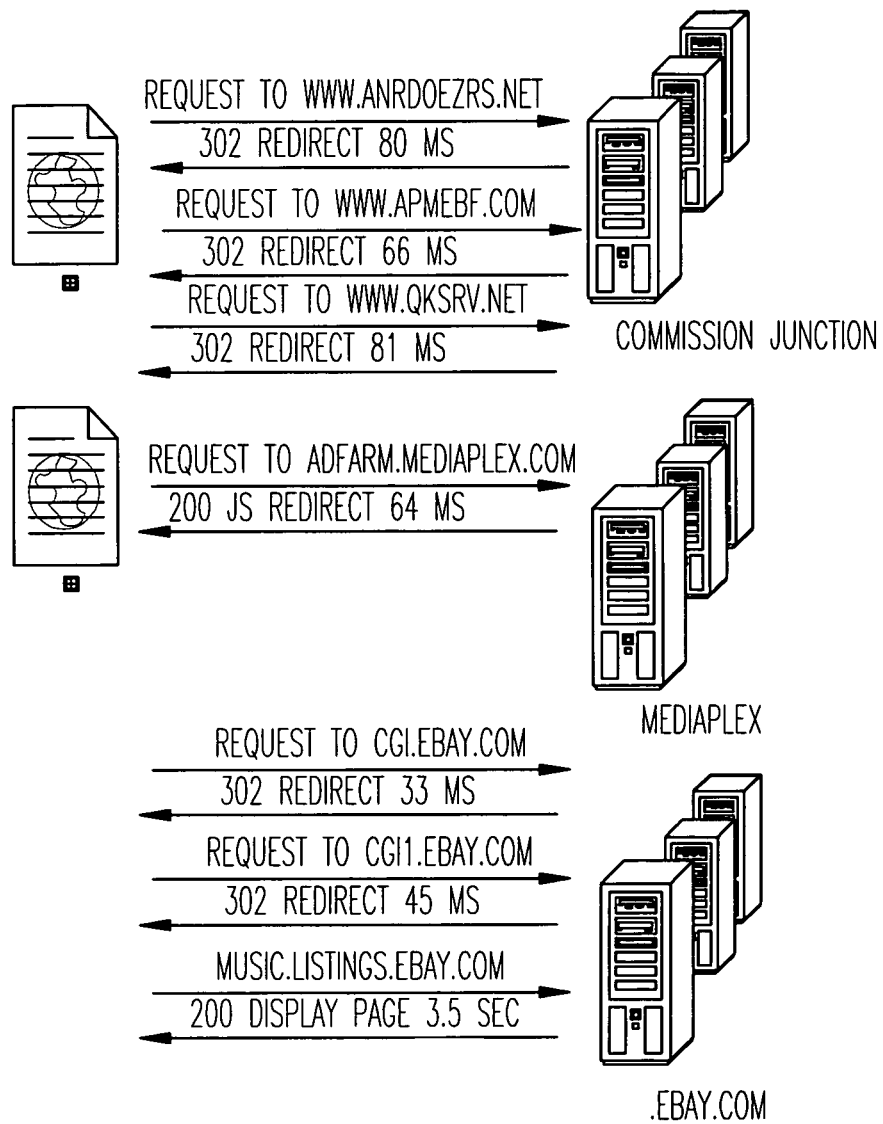

A conventional system for affiliate link entry is shown in FIG. 11.

Figure 12:
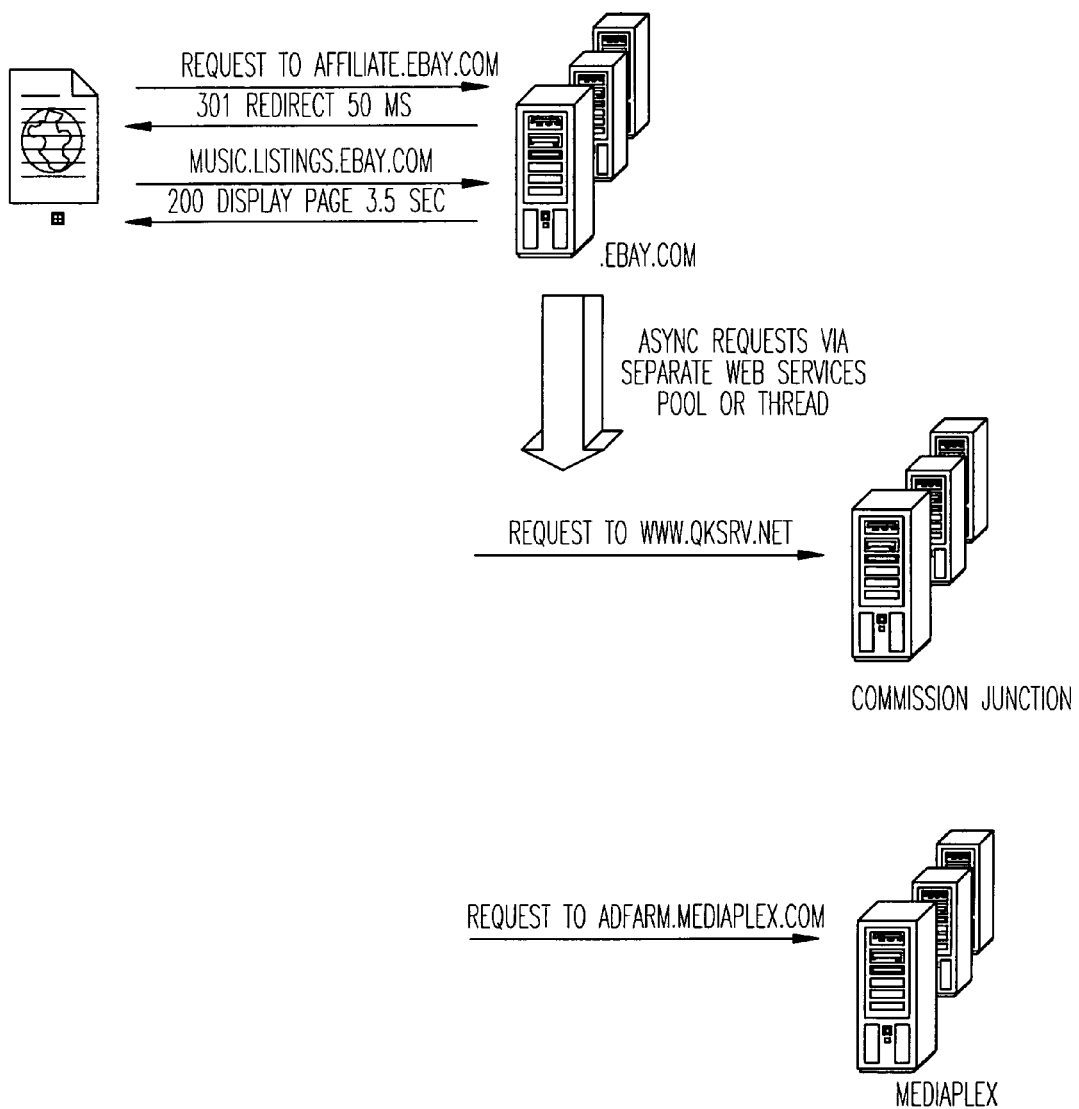

FIG. 12 illustrates an improved tracking system architecture supporting affiliate link entry as described herein in various example embodiments.

Figure 13:
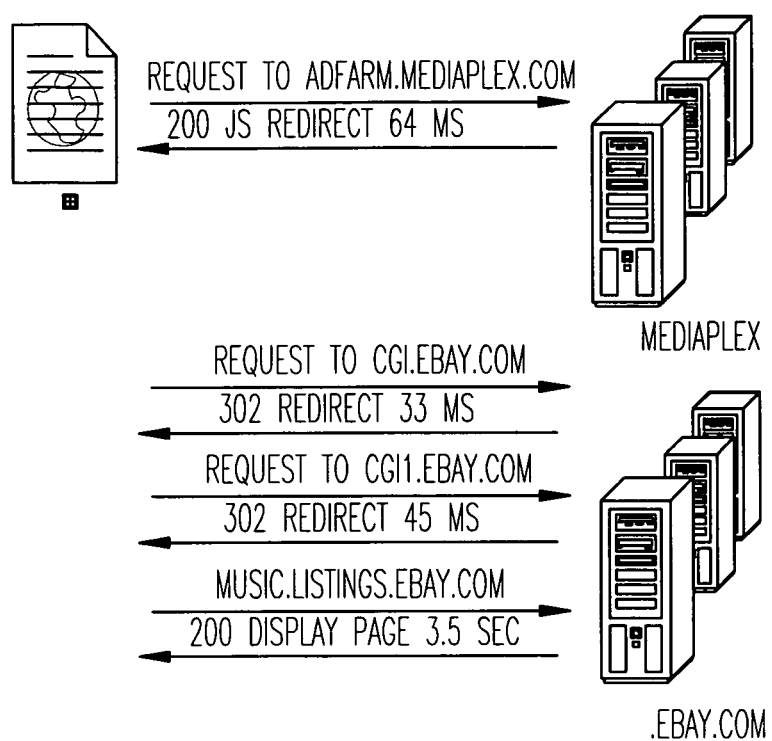

A conventional system for paid search entry is shown in FIG. 13.

Figure 14:
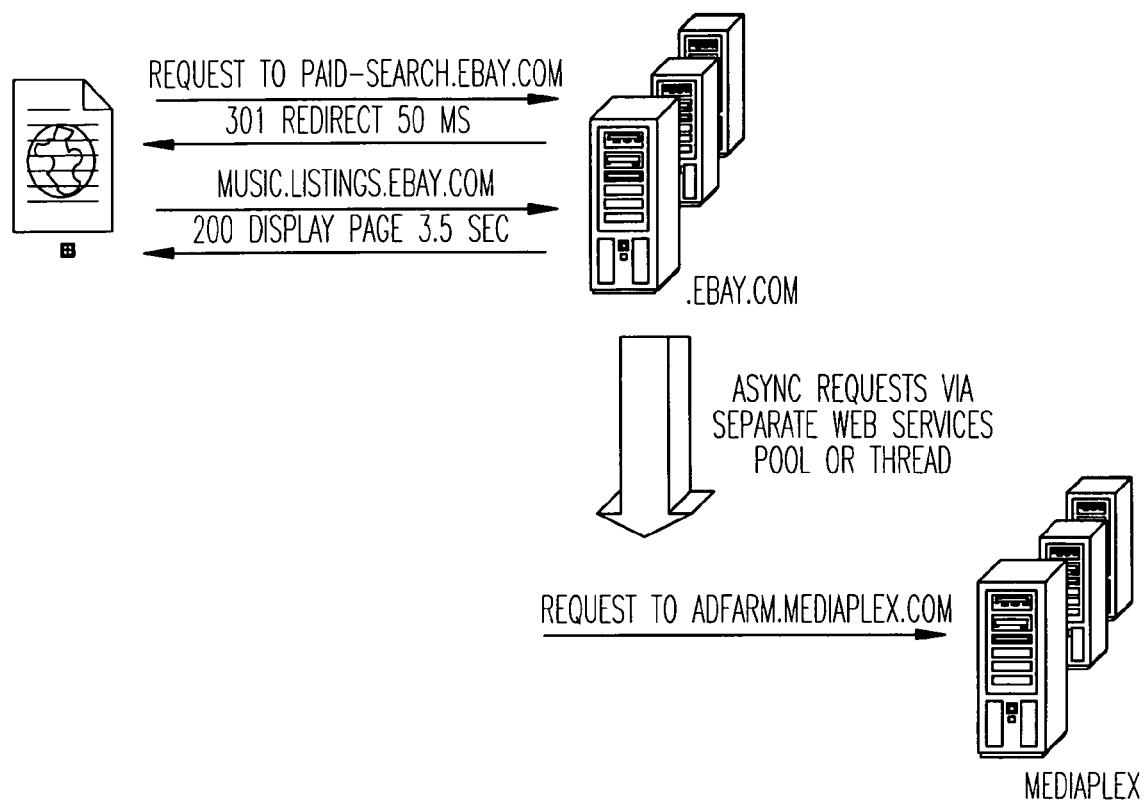

FIG. 14 illustrates an improved tracking system architecture supporting paid search entry as described herein in various example embodiments.

Figure 15:
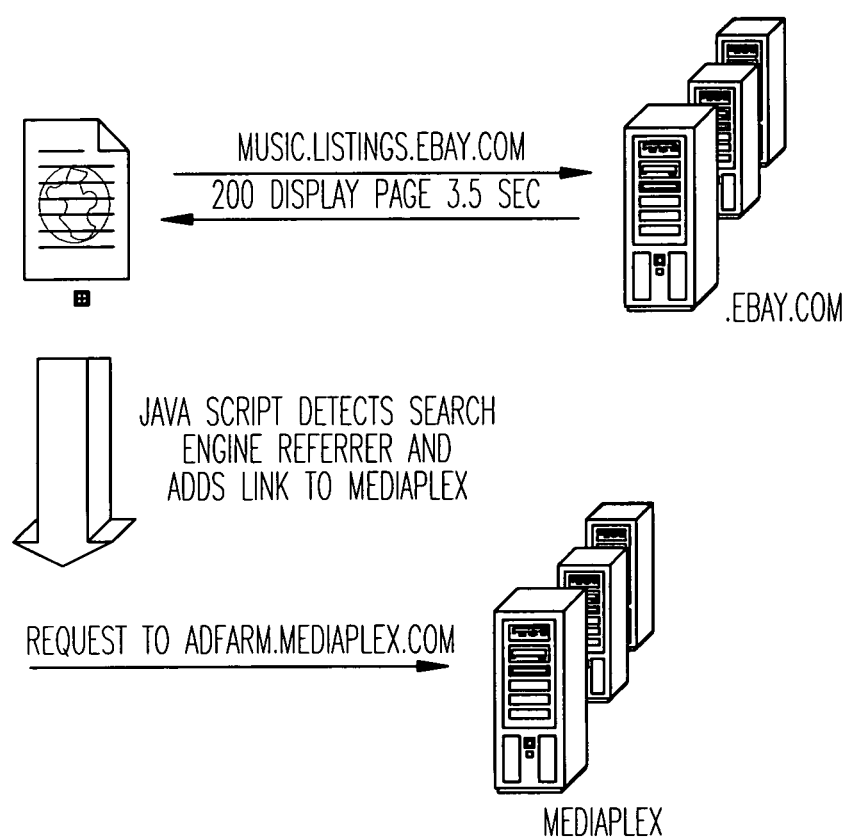

FIG. 15 illustrates a conventional system for natural search entry.

Figure 16:
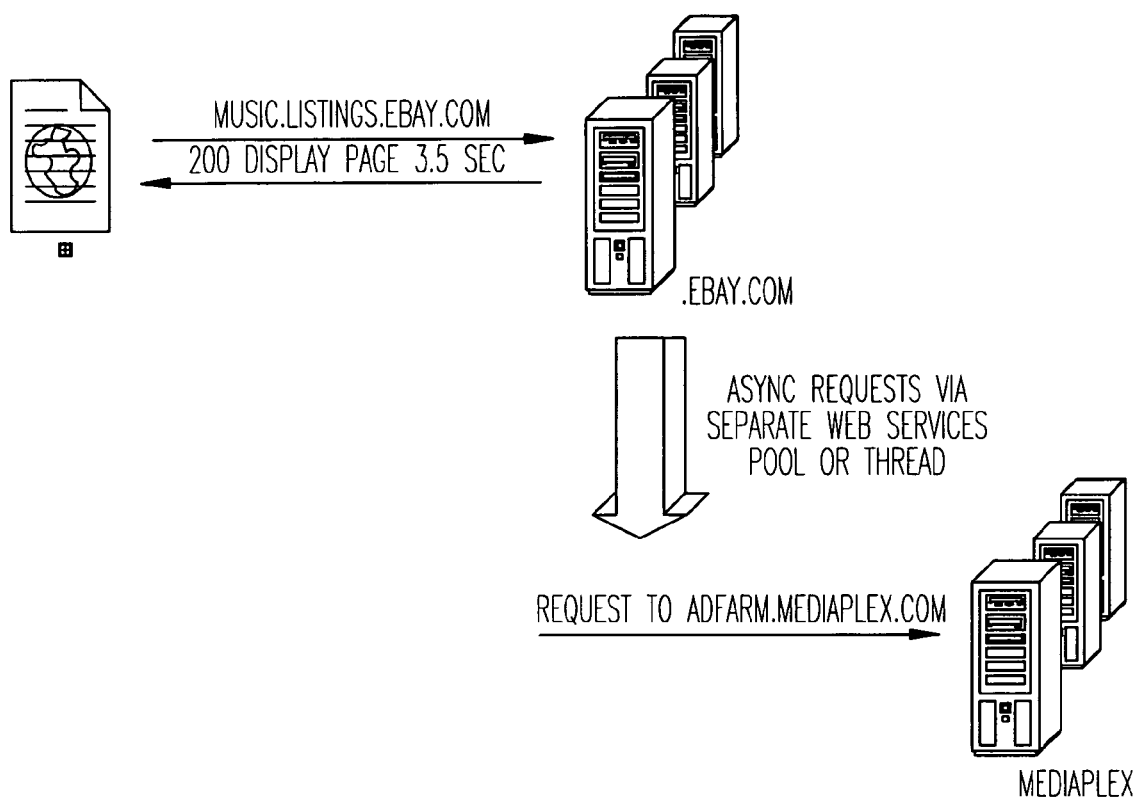

FIG. 16 illustrates an improved tracking system architecture supporting natural search entry as described herein in various example embodiments.

Figure 17:
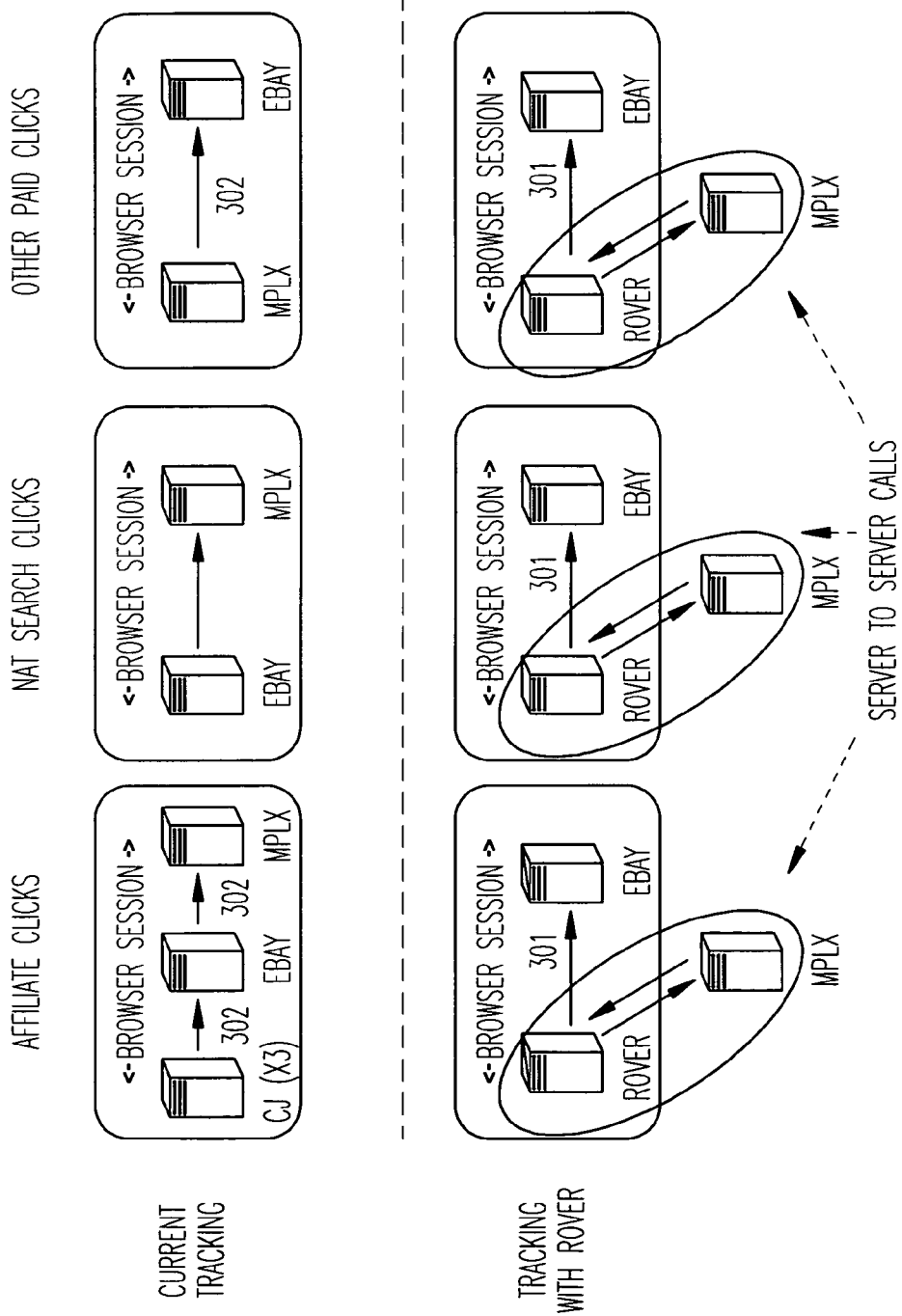

FIG. 17 illustrates a further comparison of the conventional tracking methodologies in relation to the improved tracking methodologies described herein in various example embodiments.

Figure 18:
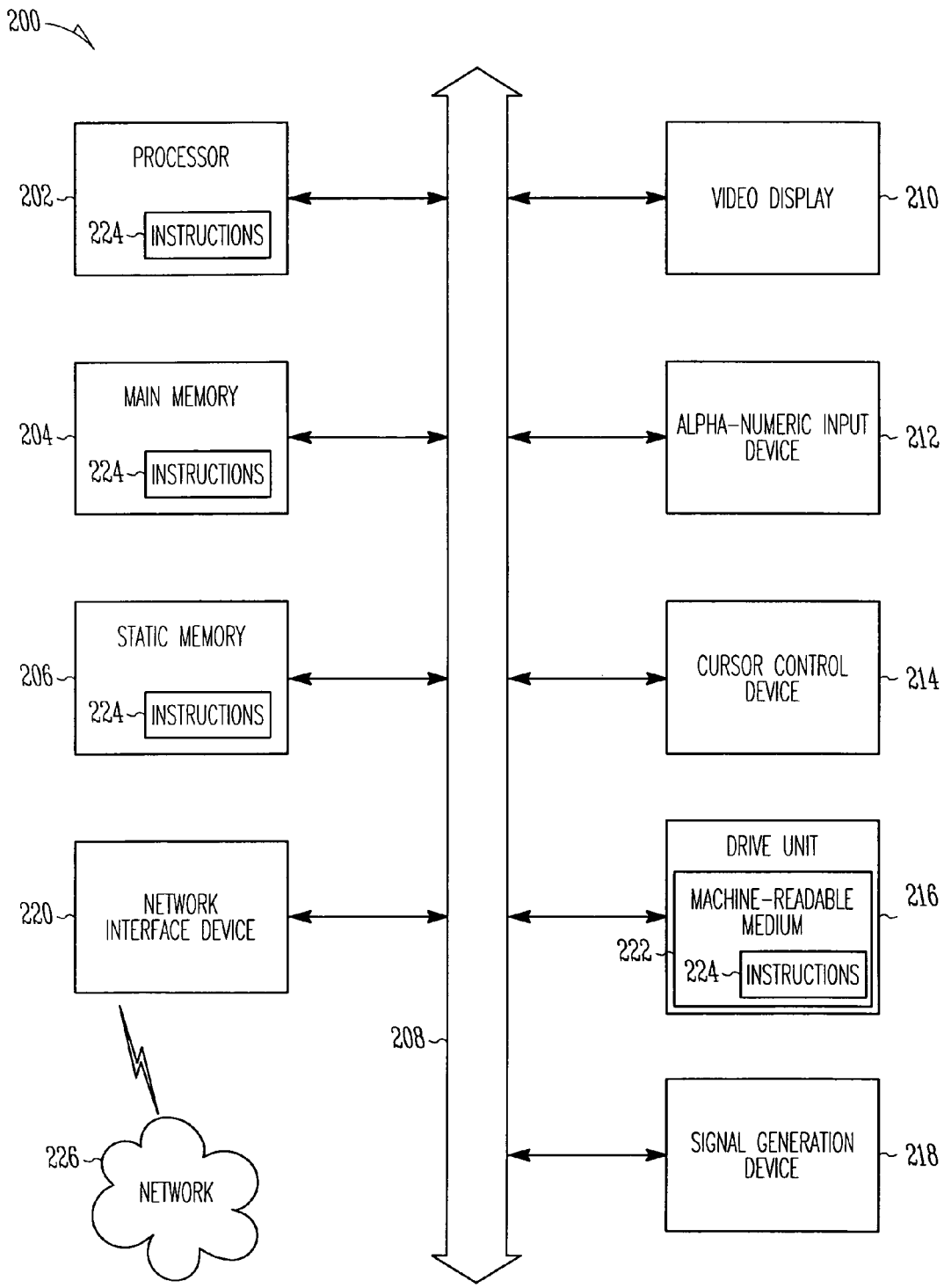

FIG. 18 shows a diagrammatic representation of a machine in the example form of a computer system.

DETAILED DESCRIPTION

In the following description, for purposes of explanation, numerous specific details are set forth in order to provide a thorough understanding of an embodiment of the present invention. It may be evident, however, to one skilled in the art that the various embodiments of the present invention may be practiced without these specific details.

Overview

An example embodiment describes a tracking method and system to allow affiliates and partners to point their links directly to the publication system (e.g., a database marketplace such as www.ebay.com or other publication system, such as http://base.google.com/base/default or www.yahoo.com) so that the publication system receives the link popularity value of those links.

Figure 1:
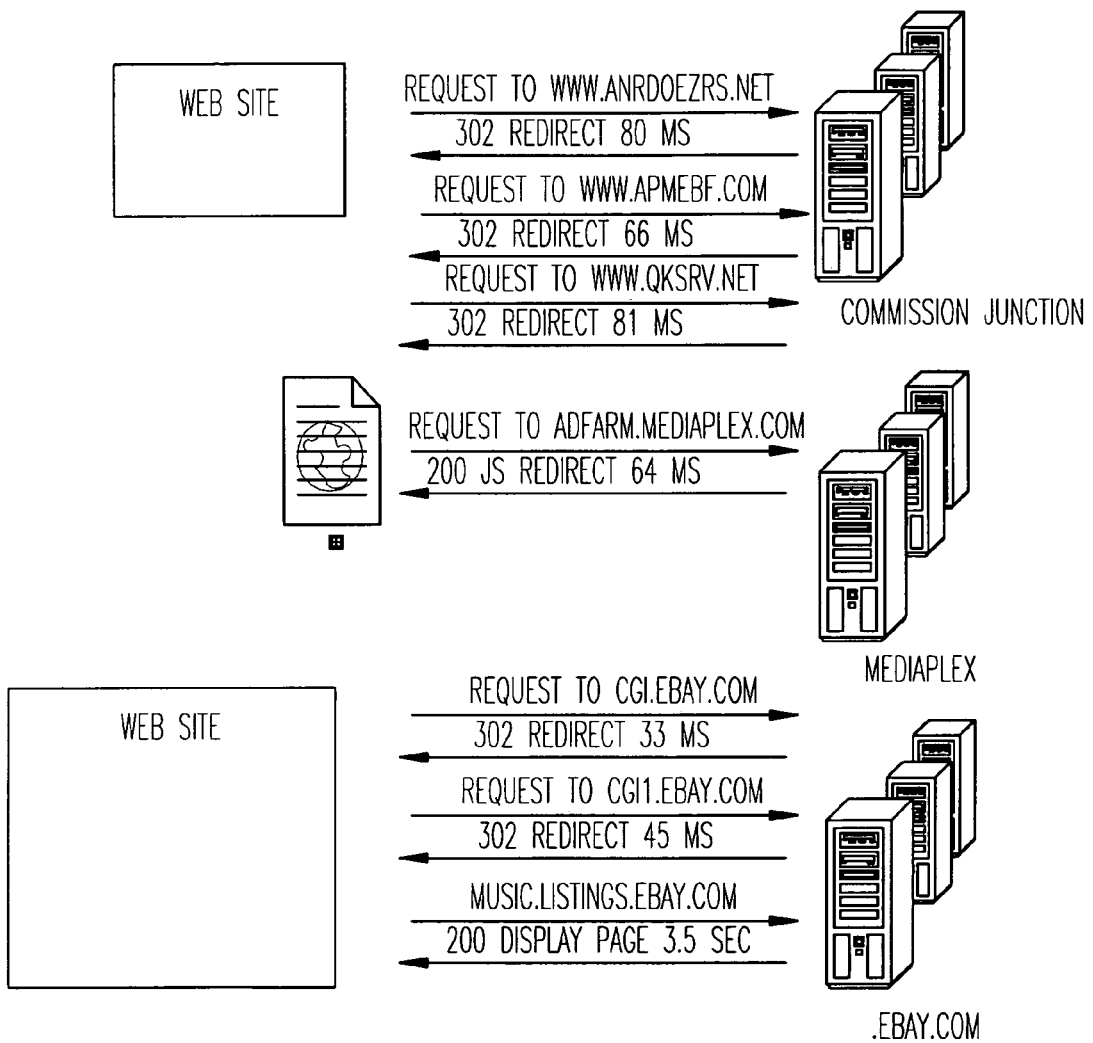
FIG. 1 illustrates a conventional affiliate link entry system.

One affiliate entry path goes through numerous redirects as shown in the conventional affiliate link entry system illustrated in FIG. 1.

Problems with conventional tracking solutions include:

Ad blocking issues (Advertising servers, such as Mediaplex and other tracking partner cookies and URLs (Uniform Reference Locators) are blocked). The widespread use of anti-spyware blocking software can prevent accurate tracking of the use of the site. This software frequently blocks cookies used by our tracking partners and in some cases, blocks URLs to the domains as well.

Natural Search Tracking issues (5-15% variance because tracking is in JavaScript (JS) footer) can cause inaccurate payouts for Affiliates Page rank issues for Paid Search (traffic may not come directly to the publication system). Page rank is not transferred from affiliate links to the target publication system pages due to the way the linking redirects issued by partners are done.

Too many disparate tracking and advertisement (ad) serving technologies with an overarching system of control and management.

Significant JavaScript execution times on the Client for ad serving and click tracking.

Significant JavaScript page weight and number of objects on all pages

Numerous connections and redirects to external third party sites from clients. The lengthy redirect chain increases the likelihood of a single outage blocking off a portion of desired traffic.

An example embodiment described herein moves the calls made to affiliate tracking partners of the publication system (e.g., advertising servers, such as Mediaplex) behind the publication system servers. In this manner, the publication system's tracking and ad-serving technologies are moved off of the client tier. The publication system's servers proxy any tracking requests to the third-party via an asynchronous backchannel. The publication system's server will proxy any ad serving requests to the third party via a synchronous call. To keep the impact of the interface as low as possible, the requests may appear to come directly from HTTP clients (i.e. browsers) as much as possible. This means that enough context from the original requests may be collected so that the HTTP request made to an advertising server (e.g. Mediaplex) appears to be from the original client.

Figure 2:
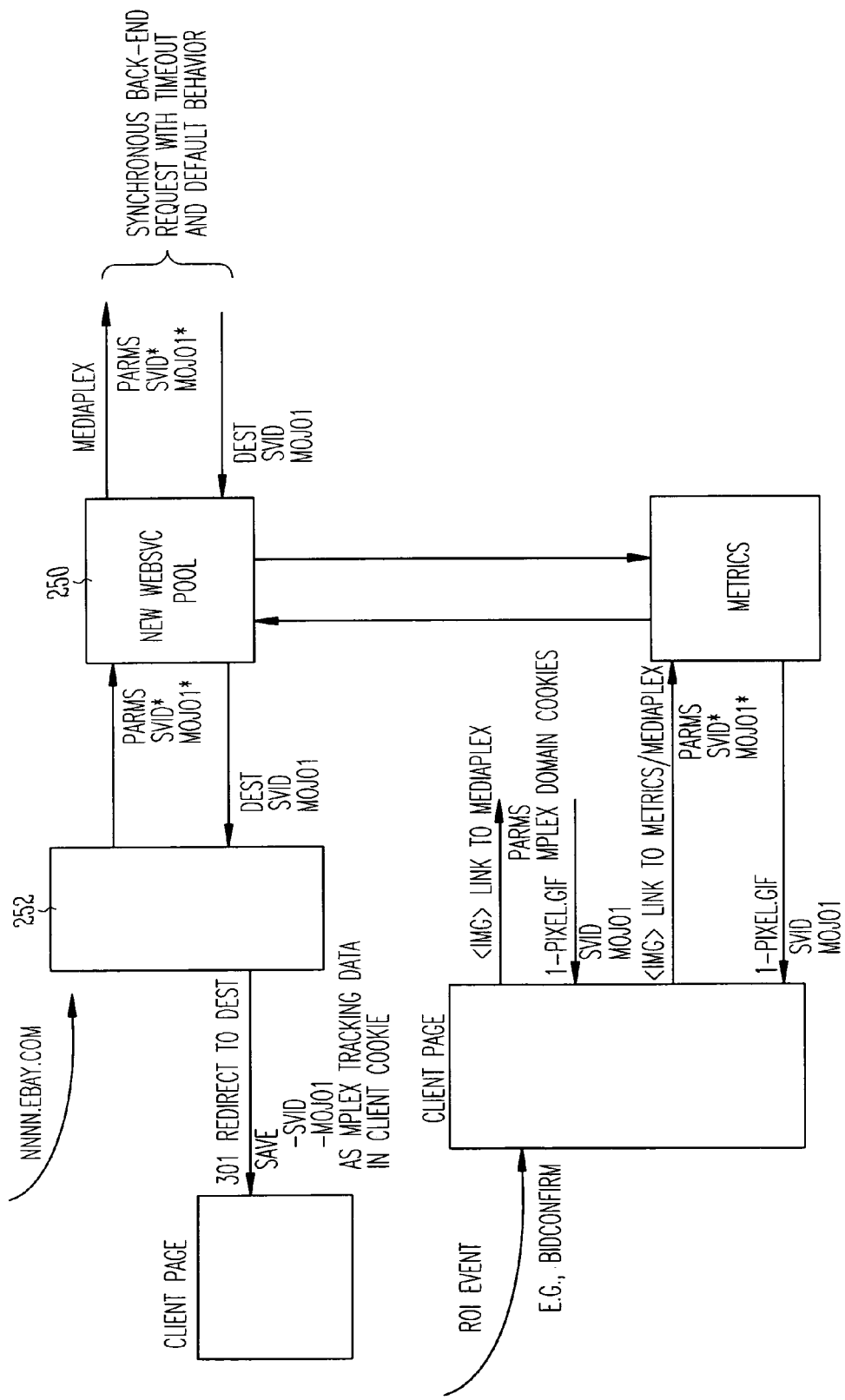
FIG. 2 illustrates an example architecture of a tracking system, according to an example embodiment.

This example embodiment may provide the following benefits:

- Improve the publication system page rank in natural search results
- Eliminate (or at least reduce) numerous connections and redirects to external third party sites from clients.
- Reduce Javascript execution times on the Client for ad serving and click tracking.
- Reduce Javascript page weight and number of objects on all pages.
- Reduce impact of ad blocking software that blocks the publication system's partners' tracking domains
- improve accuracy of link popularity values and affiliate payouts FIG. 2 illustrates an example architecture of a tracking system, according to an example embodiment. Central to the architecture is a Web service pool 250, which serves as the focal point for communication between the publication system and tracking partners of the publication system. The terms defined below are used in one example embodiment.

Optimized Tracking URL—A tracking URL may lead a user to the publication system site. This type of URL can be used for search and view of items. It is the same as the underlying URL with additional parameters added. An example would be as follows:

http://cgi.the publication system.com/Sub-Zero-Stainless-All-Fridge-All-Freezer-2-Built-In-NR_W0QQitemZ7541240878?rover=1/711-1751-2978-71/1&_rvPID=123456

Tracking partner—This is a generic term for a third party tracking service. Affiliate tracking services are offered by, for example, advertising servers, such as Mediaplex.

Universal Tracking URL—A tracking URL may lead a user to the publication system site. This type of URL can be used for any publication system URL on the site. An important aspect of the Universal Tracking URL is that instead of adding Rover (e.g. tracking) parameters to an existing URL (like the optimized tracking URL described above), a Universal Tracking URL uses a target URL parameter (mpre=in the example below). The advantage is that the target page can be static HTML or some other system that does not have to be modified to interpret the Rover parameters. An example is shown below.

http://rover.the publication system.com/rover/1/711-1751-2978-71/1?mpre=http://cgi.the publication system.com/Sub-Zero-Stainless-All-Fridge-All-Freezer-2-Built-In-NR_W0QQitemZ7541240878&PID=123456

Regular expressions—Regular expressions may describe a set of strings based on common characteristics shared by each string in the set. For details of the expression syntax used in various embodiments, see: http://java.sun.com/docs/books/tutorial/extra/regex/.

ROI—Return On Investment, a generic term used to refer to revenue generating events like BidConfirm and RegistrationConfirm. When these events are correlated with an affiliate referral, the affiliate is paid money from the publication system.

PIM cookielet—A session cookielet is used to communicate to natural search detection that a request should not be sent to track a natural search hit because it went through paid internet marketing (PIM, such as affiliate, paid-search, etc. . . . )

Example functionality of the features of one embodiment can be broken down into the following areas. Each area is described below in its own section.

Web Service Pool
Click Tracking API
Click Tracking Command
Search Front-end integration
ViewItem Front-end integration
ROI Integration
Natural Search Detection
Link Generation Tools
Reporting Web Service Pool In an example embodiment, this pool 250 may serve as the focal point for all the publication system to tracking partner communications. The interface for this pool is described below. Clients of this service may be other publication system commands. This pool is, in an example embodiment, not referenced externally.

The WebService 250 may have two operations in an example embodiment.

trackImpression
trackEntry.

TrackImpression Operation

The trackImpression operation is used to track impressions or ROI events. It is invoked as part of the natural search and ROI event scenario. It has one input, a TrackingRequest, which is defined in the Web Service Definition Language (WSDL) in the following way.

```
<complexType name="TrackingRequest">
  <sequence>
    <element name="trackingDataSegment" type="xsd:string"/>
    <element name="languagePreference" nillable="true"
    type="xsd:string"/>
    <element name="trackingPartner" type="xsd:int"/>
    <element name="sessionGUID" nillable="true" type="xsd:string"/>
    <element name="clickId" nillable="true" type="xsd:int"/>
    <element name="tpCookies" nillable="true" type="xsd:string"/>
    <element name="clientGUID" nillable="true" type="xsd:string"/>
    <element name="uid" nillable="true" type="xsd:string"/>
    <element name="channel" type="xsd:string"/>
    <element name="siteId" type="xsd:int"/>
    <element name="transactionType" nillable="true" type="xsd:string"/>
    <element name="referrer" nillable="true" type="xsd:string"/>
    <element name="requestUri" type="xsd:string"/>
    <element name="remoteIpAddr" type="xsd:string"/>
    <element name="clientReqHost" type="xsd:string"/>
    <element name="userAgent" nillable="true" type="xsd:string"/>
    <element name="requestId" type="xsd:string"/>
    <any processContents="lax" minOccurs="0"
```

-continued

```
    maxOccurs="unbounded"/>
  </sequence>
</complexType>
```

The output from the trackImpression operation is a TrackingResponse, as detailed below.

```
<complexType name="TrackingResponse">
  <sequence>
    <element name="status" type="xsd:int"/>
    <element name="tpCookies" nillable="true" type="xsd:string"/>
    <element name="errorMsg" nillable="true" type="xsd:string"/>
    <any processContents="lax" minOccurs="0"
    maxOccurs="unbounded"/>
  </sequence>
</complexType>
```

The trackImpression operation, in an example embodiment, uses the input from the TrackingRequest to send a request to a tracking partner; the result of which is used to build the TrackingResponse.

The specific data elements are listed below. However, the below descriptions are not intended as limiting definitions of the respective terms, and the terms may be construed more broadly than the below provided descriptions.

trackingDataSegment—This identifies the segment for the partner. For a tracking partner, this is the rotation identifier. For example, 711-518-1801-6.

languagePreference—This is the value of the Accept-Language header passed from the web client as described at http://www.w3.org/Protocols/rfc2616/rfc2616-sec14.html-sec14.4 If there is no value for this header, then this field should be null.

trackingPartner—This identifies the tracking partner and references the connection configuration. For a specific tracking partner this may be, for example, "1".

sessionGUID—This identifies the search processor session guid (globally unique identifier) from the requestor. This comes from the cookies presented by the request to the command that is calling the web service and is used in the generation of the search processor event by the web service.

clickId—This identifies the search processor click count from the requestor. This comes from the cookies presented by the request to the command that is calling the web service and is used in the generation of the search processor event by the web service.

tpCookies—This is the cookie string to pass to the Tracking Partner as part of the web request. For a specific tracking partner, this may be the values for svid and mojo1 if either has been stored previously. The publication system may store these values in the non-session cookie for the user as a cookielet. Example value of this parm: "svid=nnnnnnnn; mojo1=. . . ".

clientGUID—This identifies the processor session guid (globally unique identifier) from the requester. This comes from the cookies presented by the request to the command that is calling the web service and is used in the generation of the search processor event by the web service.

uid—This identifies the identifier of the signed in user, if present. This comes from the cookies presented by the request to the command that is calling the web service and is used in the generation of the search processor event by the web service.

channel—A short string identifying the marketing channel this tracking event belongs to. The possible values are
AFFL—affiliates
PSRCH—paid search
NSRCH—natural search
PORTAL—portals
Channel is not passed on ROI events.

siteId—A numeric identification of the originating site.

transactionType—A short string that identifies the type of transaction. This is present only on ROI events. An example value: BIN-FP, for fixed-price BIN. The full set of values is the same as currently used for ROI tags.

referrer—The referrer URL from the client as described at http://www.w3.org/Protocols/rfc2616/rfc2616-sec14.html#sec14.36 If no referrer is present, this field is null.

requestUri—The request URI for the request to the trading partner. For example, /ad/bk/711-518-1801-6?BIN-FP=1& BIN-FP-11233=1&mpuid=2577082; 4735966129 remoteIpAddr—This identifies the remote IP address from the client. This would be the HTTP remote IP unless there is a X-Forwarded-For header in the request. In the case of an X-Forwarded-For header being present, the whole value is passed. It may be a comma-separated list of proxies that form a path for the request. This field cannot be null.

clientReqHost—This identifies the host name in the original client request. This comes from the Host: request header. This is placed in an X-Forwarded-For header in the request sent to the tracking partner.

userAgent—The value of the User-Agent string as described at http://www.w3.org/Protocols/rfc2616/rfc2616-sec14.html#sec14.43 If there is no value for this header, then this field should be null.

requestId—This string uniquely identifies this request. Its purpose is to tie together the logging generated by the web service to the logging from the requesting server.

status—This is the status code of the web service request. It can be one of these values
200—success
501—timeout, the call to A tracking partner failed due to a timeout
502—mark down, the call failed because the command has been marked down
503—remote error, the call failed on a tracking partner's server for some reason, check error message.
504—service error, the call failed on the Rover web service server for some reason, check error message.

errorMsg—A string message that provides more information about any errors.

TrackEntry Operation

The trackEntry operation may, in one example embodiment, be used to track entry to the publication system site. It is invoked as part of the affiliate and paid-search scenarios. It has one input, an EntryTrackingRequest, and one output, an EntryTrackingResponse. These two objects extend the corresponding objects from the impression tracking operations. The inputs and outputs are detailed below using WSDL.

```
<complexType name="EntryTrackingRequest">
  <complexContent>
    <extension base="impl:TrackingRequest">
      <sequence>
        <element name="targetLocation" nillable="true" type="xsd:string"/>
```

-continued

```
    <any processContents="lax" minOccurs="0"
      maxOccurs="unbounded"/>
    </sequence>
   </extension>
 </complexContent>
</complexType>
``` and

```
<complexType name="EntryTrackingResponse">
 <complexContent>
  <extension base="impl:TrackingResponse">
    <sequence>
      <element name="destination" nillable="true" type="xsd:string"/>
      <any processContents="lax" minOccurs="0"
      maxOccurs="unbounded"/>
    </sequence>
   </extension>
 </complexContent>
</complexType>
```

The additional fields in the objects defined above have the following meanings in an example embodiment.

targetLocation—This is the destination requested by the client for the endpoint of the link.

destination—This is the destination that might come back from the call to A tracking partner if the target is redirected. That is, a tracking partner returns a 30× return code and this is the value of the Location: response header.

Interface to Tracking Partner

The interface between the publication system and a specific tracking partner, according to an example embodiment, is described below. Whether or not an external call to a specific tracking partner is made may be controlled by a feature contingency as detailed below.

```
<The publication systemEntity id="Rover-A tracking
partnerExternalCalls" value="1037"/>
  <The publication systemFeatureContingency id="Rover-A tracking
partnerExternalCalls" deprecated="false" comment="">
    >Make external calls to a tracking partner from the Rover service
pool</The publication systemFeatureContingency>
```

Further, a sampling percentage stored in the PUBLICATION SYSTEM_SITE_PARAMETER table (detailed below) may also be used to allow us to "dial-up" the traffic.

THE PUBLICATION SYSTEM_SITE_PARAMETER

| SITE_ID | PARAM_TYPE | PARAM_NAME | PARAM_VALUE |
|---|---|---|---|
| <site-id> | RoverTracking | A tracking partnerExtCallRate | <int-0-100> |

Where

<site-id> is the site id, for example 0=THE_PUBLICATION_SYSTEM_US.

and

<int-0-100> is the sampling rate to apply to requests to determine if ROI events should be generated for a tracking partner. The GUID used as input is the one passed in the service request.

Tracking Service

In an example embodiment, the publication system internal Tracking Service provider may serve as the primary interface (or proxy) between the publication system and it's tracking partners. The internal communication between this service and other the publication system components may be based on the well-known XML-based communication SOAP protocol. To ensure the high availability of this functionality within the publication system, this Tracking Service may be set up as a publication system internal Web Service pool as described above, fronted by a load balancer. The web service pool is herein referred to as the Rover Web Service pool. In an alternative embodiment, the communication between the publication system and a partner Tracking Service may happen in the form of an HTTP request.

Architecture Overview

An architectural overview of an example embodiment is shown in FIG. 3. The example embodiment as shown in FIG. 3 depicts the Tracking Service architecture 301, according to an example embodiment. At the top of the stack, the publication system Tracking Service layer 310 provides an abstraction between the client (e.g. Search, ViewItem, etc. . . . ) 318 and the Rover Web Service component 316. Beneath the abstraction, the Web Service Client 312 and the Web Service Presentation 314 components provide yet another layer of abstraction for sending and receiving SOAP-based requests from the client 318 and the Rover Web Service component 316 respectively. In the example embodiment shown in FIG. 3, the Rover Web Service component 316 uses a conventional SOAP interface. In other embodiments, a Representational State Transfer (REST) style interface can be used if the SOAP overhead becomes too expensive.

Service API Overview

The tracking service, in one example embodiment, presents a Java API (application programming interface) to be used for sending data to the tracking partner. The API is designed to handle requests from any one or more of multiple application servers, as well as the Rover Web Service pool based on the deliverable configuration. The API consists of a TrackingServiceManager class, which serves as the primary entry point to access the service, TrackingServiceConfig class, and a series of helper classes. A UML (unified modeling language) diagram illustrated in FIG. 4 presents an overview of the Java API in an example embodiment.

Tracking Service Manager

The TrackingServiceManager, in one example embodiment, serves as the main entry for accessing the publication system Tracking Service. Based on the deliverable configuration and the requested the publication system tracking partner, the manager returns the appropriate tracking service instance. If the call is originated from the Rover Web Service pool, the manager returns an instance of the requested tracking service (e.g. a tracking partnerInvocation), which is capable of sending and receiving data to and from the requested partner via HTTP. On the other hand, if the call is from one of the application servers, an instance of the publication systemTrackingService may be returned instead.

Aside from its primary task, the TrackingServiceManager, in one embodiment, is also responsible for:

1) loading the deliverable's tracking service configuration;
2) caching the created tracking service instance;
3) initializing the proper partner tracking URL builder; and
4) initializing the Web Service Client, etc. . . . .

A TrackingServiceManager initialization sequence diagram of an example embodiment is illustrated in FIG. 5.

A Tracking partner connection parameter (param) detection sequence diagram of an example embodiment is illustrated in FIG. 6.

Tracking Service Configuration

Each tracking service, in an example embodiment, can be statically and dynamically configured through a configuration category bean. Beans are well-known forms of reusable software components. At server start up time, the bean is initialized with properties that are specified in a configuration file, TrackingService.xml, associated with the deliverable. In this file, it is possible to have the configuration of one or more internal and/or external tracking services. Rover Web Service deliverable—one or more publication system partner configurations can be specified in this deliverable. An example is illustrated below.

```
<?xml version="1.0" encoding="UTF-8"?>
<tracking-service-config
xmlns:xsi="http://www.w3.org/2001/XMLSchema-instance">
   <partner-tracking-service name="MPLX">
      <!-- the publication system partner host name -->
      <host>adfarm.a tracking partner.com</host>
         <!-- the publication system partner port -->
      <port>80</port>
         <!-- the publication system partner specific cookie names -->
      <expected-cookies>
         <cookie>svid</cookie>
         <cookie>mojo1</cookie>
      </expected-cookies>
         <!-- properties for the http connection to our the publication system partner -->
      <connection-timeout>10</connection-timeout>
      <keep-alive-timeout>10</keep-alive-timeout>
      <num-retries>2</num-retries>
      <max-active-threads>1</max-active-threads>
      <max-available-threads>2</max-available-threads>
      <allowable-timeout-threshold>10</allowable-timeout-threshold>
      <consecutive-failure-threshold>30</consecutive-failure-threshold>
   </partner-tracking-service>
</tracking-service-config>
```

Tracking Service URL Builder

Given a TrackingRequest as detailed above, a specialized PartnerTrackingUrlBuilder may be made available through the TrackingServiceManager to construct a partner URL. Based on the initial TrackingServiceManager.getService( ) call and the tracking service configuration, a publication system partner URL builder is created and made available for the client to construct a partner tracking URL from the given request.

Tracking Response Handler

A tracking response helper class, TrackingResponseHandler, appropriately adds partner cookies into or from the tracking response.

Tracking Commands

ROI Tracking

This command is used to track an event. It may send a request to the tracking partner and return a 1-pixel .gif. If it is required to display the containing page referring URL, then the <img> tag that invokes this command must be wrapped in JavaScript that passes the referring URL as a parameter. Because the command may need to be placed on https or http pages, it is always sent https.

In an example embodiment, the syntax (core) is represented as follows.
https://rover.the publication system.com/roverroi/[tracking-provider-id]/[tracking-data-segment]? tranType=[transaction-type]&siteId=[site-id]&[parameter1]=[value1]&[parameter2]=[value2]&.

Where [tracking-provider-id] may be 1 for a specific tracking partner and [tracking-data-segment] may be the rotation id, for example 711-518-1801-6. The [transaction-type] is the same string passed on existing tags. For example, BIN-FP for a fixed price BIN. The [site-id] is the numeric site id for the tag, for example 0 (the publication system US) or 100 (US Autos).

As an example, this tracking command (also referred to herein as a rover command) is represented as follows.
https://rover.the publication system.com/roverroi/1/711-518-1801-6? TranType=BIN-FP&BIN-FP-11233=1siteId=0&mpuid=2577082;4735966129

This tracking command may cause the following to be sent to a pay tracking partner via the invocation as described above.
http://adfarm.a tracking partner.com/ad/bk/711-518-1801-6?BIN-FP=1& BIN-FP-11233=1& mpuid=2577082;4735966129

Entry Tracking

This command, in an example embodiment, implements the universal tracking URL as described herein. It causes entry to the publication system site after first recording a referral for the affiliate with a trading partner.

The general form for this command, in an example embodiment, may be represented as follows.
http://rover.the publication system.com/rover/[tracking-provider-id]/[tracking-data-segment]/[channel]?PID=[affiliate-id] & . . . &loc=[target-location]

Where [tracking-provider-id] is 1 for a specific tracking partner and [tracking-data-segment] is the rotation id, for example 711-1751-2978-71. The [channel] indicates the IM channel for this link and is defined as follows.

1—affiliate entry
2—paid search
3—natural search (not used in this context, but reserved anyway)
4—portal The [affiliate-id] indicates the affiliate or partner responsible for the link. Finally, [target-location] is the target location for the link.

As an example, this command can be represented as follows.
http://rover.the publication system.com/rover/1/711-1751-2978-71/1?PID=123456&loc=http %3A%2F%2Fcgi.the publication system.com%2F Sub-Zero-Stainless-All-Fridge-All-Freezer-2-Built-In-NR_W0QQitemZ7541240878

This command may be sent to a tracking partner as represented below.
http://adfarm.a tracking partner.com/ad/ck/711-1751-2978-71?mpre=&PID=123456& loc http %3A%2F%2Fcgi.the publication system.com%2F Sub-Zero-Stainless-All-Fridge-All-Freezer-2-Built-In-NR_W0QQitemZ7541240878

Search Front-End Integration

The search front end is updated to recognize the tracking command specific parameters, use the Tracking Service API to send the tracking entry and then redirect to the intended entry target. The tracking service APIs provide a way to do this at the callBizTier( ) level as shown in the example below.

```
/**
 * Show an example of calling the tracking interface.
 * @param context contains information about the request
 * @return a WebCommandResponse object
 * @throws BizTierCallFailedException
 */
```

-continued

```
protected WebCommandResponse callBizTier(WebContext context)
throws BizTierCallFailedException {
 WebCommandResponse response = new WebCommandResponse( );
 // Is this an optimized URL?
 if
(context.getRequestParameterMap( ).-
containsKey(TrackingRequestBuilder.ROVER_PARM)) {
   // Construct an entry tracking request
   The publication systemEntryTrackingRequest req =
TrackingRequestBuilder.buildEntryTrackingRequest(context);
   // Get the service interface
   The publication systemTrackingService srvc =
TrackingServiceManager.getService(req.getTrackingPartner( ));
   // invoke the service
   The publication systemEntryTrackingResponse resp =
   srvc.trackEntry(req);
   // process the response
   TrackingResponseHandler.handleResponse(resp, context);
   // redirect to the indicated target
   final String location = resp.getDestination( );
   // Set redirect info so that request is redirected
   RedirectInfo redirInfo = new RedirectInfo(
     new RedirectURLBuilder( ) {
       public String buildUrl(UrlService urlService,
         VacIdentity redirectToVAC, int redirectPageType) {
         return location;
       }
     });
   redirInfo.setRedirectPerm(true); // indicate that a 301 redirect should be done
   response.setRedirectInfo(redirInfo);
   response.setData(location);
 } else {
   // normal command processing
 }
 return response;
}
```

The Search URLs may include:

| | | |
|---|---|---|
| Search: Advanced Search | Search: Global Trade Hub | Search: Store Listing |
| Search: All Category | Search: In-Store Search | Search: Store Name |
| Search: Completed Search | Search: Listings | Search: Stores with matching item |
| Search: Cross Store Search | Search: Live Auction | Search: Title & Description Search |
| Search: Dynamic Category Page | Search: Sellers Other Items | Search: Title Search |
| Search: Dynamic Landing Page | Search: Similar Search | Search: Want It Now |
| | Search: Store Hub | Search: Avalon |

In addition to these search pages, the Product Detail Pages and the Product Based Search (single domain) pages may also support the optimized URL.

ViewItem Front-End Integration

The view item front end is updated to recognize the tracking command specific parameters, use the Tracking Service API to send the tracking entry and then redirect to the intended entry target. The logic is similar to what is described above for Search front-end integration.

ROI Integration

All the existing external ROI placements for a tracking partner need an additional placement to call the tracking command. This may be accomplished by defining Rover (the web service pool) as an additional provider and adding additional tracking tags as needed. The list of tracking tags for which this may be performed is shown below.

To facilitate the testing and validation of the links to Rover (the web service pool), the ROI tag validation process may be enhanced to allow an alternate host name in the tag for staging versus production. This may allow the new tags to be validating using a tracking command running in staging as opposed to the production pool.

The generation of Rover-A tracking partner ROI tags may be controlled by a feature contingency. An example is shown below.

```
<The publication systemEntity id="Rover-MediaplexROILinks"
  value="1036"/>
  <The publication systemFeatureContingency id="Rover-
  MediaplexROILinks" deprecated="false" comment=""
    >Generate Rover links to call ROI events serviced by
  Mediaplex</The publication systemFeatureContingency>
```

Further, a sampling percentage stored in the PUBLICATION SYSTEM_SITE_PARAMETER table is also used to allow us to "dial-up" the traffic.

| THE PUBLICATION SYSTEM_SITE_PARAMETER | | | |
|---|---|---|---|
| SITE_ID | PARAM_TYPE | PARAM_NAME | PARAM_VALUE |
| <site-id> | RoverTracking | ROISamplingRate | <int-0-100> |

Where
   <site-id> is the site id, for example 0=THE_PUBLICATION_SYSTEM_US.
and
   <int-0-100> is the sampling rate to apply to requests to determine if ROI events should be generated for a tracking partner.

Natural Search Detection pim Cookielet

With the streamlining of the affiliate and paid search entry paths to the site, the ability to distinguish natural search entries to the site may be compromised. Checking the referrer against a list of search engines is no longer sufficient. To that end, in an example embodiment, a new cookielet is being dropped during the paid internet marketing paths (affiliates, paid-search, . . . ) that identifies the request as one that should not be flagged as a result of a natural search result referral, regardless of the actual referrer.

JavaScript

JavaScript in the footer for a Natural Search entry is changed to detect the pim cookielet. If the pim cookielet is set, then it is cleared. If not set, then a call to the natural search entry command is added, adding the containing page's referrer URL as a parameter as long as the page is not a homepage. An example of this logic follows.

```
if (command or homepage) {
  ... do nothing, Natural Search (NS) detection handled on server
} else {
  if (cookielet set) {
```

-continued

```
        clear it
    } else {
        gen call to roverns command
    }
}
```

Natural Search Entry Command

This command may check the referrer of the containing page against a list of known search engine patterns. If a match is found, then the Tracking Service API is invoked to track the natural search entry.

The list of search engine URL patterns is the same list used by search processor traffic source detection. Search processor has implemented a process that allows this list to be updated independently of a train roll.

The command is wrapped in JavaScript to add the referrer as described above and is similar to the Impression tracking command described earlier. In an example embodiment, the syntax (core) is as follows.
https://rover.the publication system.com/roverns/[tracking-provider-id]/[tracking-data-segment]?mpvl=[referrer URL]
Where [tracking-provider-id] is 1 for a specific tracking partner and [tracking-data-segment] is the rotation id, for example 711-13271-9788-0. The [referrerURL] is the URL of the referrer of the page containing the natural search tracking link.

An example of this natural search entry tracking command follows.
https://rover.the publication system.com/roverns/1/711-13271-9788-0? & mpvl=http%3A//www.google.com/search . . . .

This natural search entry tracking command may cause the following command to be sent to a specific tracking partner via invocation of the TrackImpression operation described above.
http://adfarm.a tracking partner.com/ad/lt/711-13271-9788-0?
   mpt=1127524981627&
   mpcl=http%3A//collectibles.listings.the publication system.com . . . &
   mpvl=http%3A//www.google.com/search . . . .

The mpcl parameter is supplied as the referrer of the natural search entry tracking command. The cachebuster, mpt=, parameter is computed by the natural search entry tracking command.

Natural Search Detection in Commands

In every command, Rover may integrate back-end Natural Search entry detection. To accomplish this, the WebDispatcher.dispatch( ) method may be enhanced to check for a natural search entry and if detected, may invoke the Rover Web Service to track the link. An example embodiment of this is shown in FIG. 7. The logic may parallel what is done in JavaScript for the similar check. An example in one embodiment is provided below.

```
If (pim cookielet set) {
    Clear cookielet
} else {
    if (referrer is from a SearchEngine) {
        send link to a tracking partner via webservice
    }
}
```

The Search processor has implemented a process that allows this list to be updated independently of a train roll.

The generation of a call to a tracking partner via the web service is controlled by a feature contingency. An example is provided below.

```
<The publication systemEntity id="RoverLinksFromNaturalSearch" value="1035"/>
<The publication systemFeatureContingency
id="RoverLinksFromNaturalSearch" deprecated="false" comment=""
    >Generate Rover links for detected Natural Search entries to the
site</The publication systemFeatureContingency>
```

Further, a sampling percentage stored in the PUBLICATION SYSTEM_SITE_PARAMETER table is also used to allow us to "dial-up" the traffic.

| THE PUBLICATION SYSTEM_SITE_PARAMETER | | | |
|---|---|---|---|
| SITE_ID | PARAM_TYPE | PARAM_NAME | PARAM_VALUE |
| <site-id> | RoverTracking | NSSamplingRate | <int-0-100> |

Where
   <site-id> is the site id, for example 0=THE_PUBLICATION_SYSTEM_US.
and
   <int-0-100> is the sampling rate to apply to requests to determine if a natural search link through Rover to a tracking partner should be generated.

Link Generation Tools

Product Kit

The code called by the JavaScript may generate the Rover-format links based on a Feature Contingency and sampling percentage. The feature contingency is defined as in an example provided below.

```
<The publication systemEntity id="RoverLinksFromProductKit" value="976"/>
<The publication systemFeatureContingency
id="RoverLinksFromProductKit" deprecated="false" comment=""
    >Generate Rover style links for Product Kits</The publication
systemFeatureContingency>
```

Further, a sampling percentage is stored in the PUBLICATION SYSTEM_SITE_PARAMETER table.

| THE PUBLICATION SYSTEM_SITE_PARAMETER | | | |
|---|---|---|---|
| SITE_ID | PARAM_TYPE | PARAM_NAME | PARAM_VALUE |
| <site-id> | RoverTracking | PkSamplingRate | <int-0-100> |

Where
   <site-id> is the site id, for example 0=THE_PUBLICATION_SYSTEM_US.
and
   <int-0-100> is the sampling rate to apply to requests to determine if a given request should use Rover style links. This is an integer from 0 to 100.

The sampling is based on a hash of the Search processor GUID. The decision to include a request or not can be computed this way. An example is provided below.

```
import com.the publication
system.kernel.presentation.sojourner.SojournerContext;
import com.the publication
system.kernel.presentation.sojourner.SojournerContextManager;
...
public static boolean isInSample(int pct) {
    SojournerContext sojCtx = SojournerContextManager.getInstance( );
    String guid = sojCtx.getGuid( ); //method available as of e429
    if (guid == null) {
      // don't include requests that don't have a guid assigned by this
      point
        return false;
    }
    // Get a hash value for the guid
    int guidHash = guid.hashCode( );
    int rem;
    if (guidHash < 0) {
      // the hash value can be negative, we want rem to be positive
      rem = guidHash % −100;
    } else {
      rem = guidHash % 100;
    }
    // rem is now an int from 0 to 99, we're in the sample
    // if rem is less than pct
    return rem < pct;
}
```

Editor Kit

The code called by the JavaScript may generate the Rover-format links based on a Feature Contingency and sampling percentage. The feature contingency is defined as in the following example.

```
<The publication systemEntity id="RoverLinksFromEditorKit"
value="977"/>
<The publication systemFeatureContingency
id="RoverLinksFromEditorKit" deprecated="false" comment=""
    >Generate Rover style links for Editor Kits</The publication
systemFeatureContingency>
```

Further, a sampling percentage is stored in the PUBLICATION SYSTEM_SITE_PARAMETER table.

| THE PUBLICATION SYSTEM_SITE_PARAMETER | | | |
|---|---|---|---|
| SITE_ID | PARAM_TYPE | PARAM_NAME | PARAM_VALUE |
| <site-id> | RoverTracking | EkSamplingRate | <int-0-100> |

Where
 <site-id> is the site id, for example 0=THE_PUBLICATION_SYSTEM_US.
and
 int-0-100> is the sampling rate to apply to requests to determine if a given request should use Rover style links. This is an integer from 0 to 100.

Keyword Linking Tool

The Keyword linking tools returns a list of URLs and may generate Rover-style links based on a Feature Contingency and sampling percentage. The feature contingency is defined as in the following example.

```
<The publication systemEntity
id="RoverLinksFromKeywordLinkingTool" value="978"/>
<The publication systemFeatureContingency
id="RoverLinksFromKeywordLinkingTool" deprecated="false"
    comment="" >Generate Rover style links for Keyword Linking
Tool</The publication systemFeatureContingency>
```

Further, a sampling percentage is stored in the PUBLICATION SYSTEM_SITE_PARAMETER table.

| THE PUBLICATION SYSTEM_SITE_PARAMETER | | | |
|---|---|---|---|
| SITE_ID | PARAM_TYPE | PARAM_NAME | PARAM_VALUE |
| <site-id> | RoverTracking | KwlSamplingRate | <int-0-100> |

Where
 <site-id> is the site id, for example 0=THE_PUBLICATION_SYSTEM_US.
and
 <int-0-100> is the sampling rate to apply to requests to determine if a given request should use Rover style links. This is an integer from 0 to 100.

The decision to include a request in the sample or not is computed the same way as for the Product Kit described above.

Reporting

The reporting and alerting for Rover relies on OLAP, in one embodiment. An accumulator i may focus on the inputs and outputs from the web service tier as shown in FIG. 8.

Outer CAL Transaction

The outer CAL transaction may include request information, especially the following data items.
 Site id—US=01, CA=02, UK=03, etc
 Channel—Natural Search, Paid Search, Affiliate, or Portal (entry requests only)
 Client request host—e.g. the publication system
 Type of request (entry or ROI)
 Status of web service request (success or fail)

| IM-Driven Traffic by Site-Channel-Pool | | | | |
|---|---|---|---|---|
| Site_ID | Channel | Request Host | Referrals | Errors |

Data may be updated every 10 minutes
Users may be able to filter the report by Site, Channel, or Request Host
Users may be able to view the report, regardless of the filters that are applied, over a configurable period of time by specifying the Start Day and Time and the End Day and Time Alerting An alert and/or email may be sent to an operational or administrative center if any of the following events occur.
 The Average Duration time exceeds a predetermined level. This level may be configurable.
 The number of Timeouts per call to MPLX exceeds a predetermined percentage. This level may be configurable.
 The number of errors returned from MPLX per call to MPLX exceeds a predetermined percentage. The percentage that triggers an alert may be configurable.
 All emails that are triggered must specify the time period(s) when the alerting events occurred.

An alert and/or email may be sent to an operational or administrative center if the number of Errors per Referral exceeds a predetermined percentage.

The percentage that triggers the alert may be configurable. The email that is triggered should specify the time period(s) when the error threshold was exceeded.

Inner CAL Transaction

The inner CAL transaction may be used to track statistics on the calls to the external partner. These may include the following data items.

Site ID:—US=01, CA=02, UK=03, etc.

Channel: Natural Search, Paid Search, Affiliate, or Portal (entry only)

Transaction Type: May correspond to the Transaction Types included in the ROI Tag Management Console (ROI only)

Status of external request (success, timeout, other failure)

This data is sufficient to produce reports in the following form.

| Referral Calls to MPLX by Site-Channel | | | | | |
|---|---|---|---|---|---|
| Site_ID | Channel | Sent | Ave_Duration | Timeouts | Ret_Errors |

Data may be updated every 10 minutes

Users may be able to filter the report by Site_ID or Channel

Users may be able to view the report, regardless of the filters that are applied, over a configurable period of time by specifying the Start Day and Time and the End Day and Time

| Referral Calls to MPLX by Site-Channel | | | | | |
|---|---|---|---|---|---|
| Site_ID | Trans_Type | Sent | Ave_Duration | Timeouts | Ret_Errors |

Data may be updated every 10 minutes

Users may be able to filter the report by Site_ID or Trans_Type

Users may be able to view the report, regardless of the filters that are applied, over a configurable period of time by specifying the Start Day and Time and the End Day and Time.

Web Service WSDL

The Rover Web Service, in an example embodiment, may be defined with the following WSDL.

```
<?xml version="1.0" encoding="UTF-8"?>
<wsdl:definitions targetNamespace="urn:TrackingService:1.0"
xmlns="http://schemas.xmlsoap.org/wsdl/"
xmlns:apachesoap="http://xml.apache.org/xml-soap"
xmlns:impl="urn:TrackingService:1.0" xmlns:intf="urn:TrackingService:1.0"
xmlns:soapenc="http://schemas.xmlsoap.org/soap/encoding/"
xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema">
    <wsdl:types>
        <schema targetNamespace="urn:TrackingService:1.0"
xmlns="http://www.w3.org/2001/XMLSchema">
            <import namespace="http://schemas.xmlsoap.org/soap/encoding/"/>
            <complexType name="TrackingRequest">
                <sequence>
                    <element name="trackingDataSegment" type="xsd:string"/>
                    <element name="languagePreference" nillable="true" type="xsd:string"/>
                    <element name="trackingPartner" type="xsd:int"/>
                    <element name="sessionGUID" nillable="true" type="xsd:string"/>
                    <element name="clickId" nillable="true" type="xsd:int"/>
                    <element name="tpCookies" nillable="true" type="xsd:string"/>
                    <element name="clientGUID" nillable="true" type="xsd:string"/>
                    <element name="uid" nillable="true" type="xsd:string"/>
                    <element name="channel" type="xsd:string"/>
                    <element name="siteId" type="xsd:int"/>
                    <element name="transactionType" nillable="true" type="xsd:string"/>
                    <element name="referrer" nillable="true" type="xsd:string"/>
                    <element name="requestUri" type="xsd:string"/>
                    <element name="remoteIpAddr" type="xsd:string"/>
                    <element name="userAgent" nillable="true" type="xsd:string"/>
                    <element name="requestId" type="xsd:string"/>
                    <any processContents="lax" minOccurs="0" maxOccurs="unbounded"/>
                </sequence>
            </complexType>
            <complexType name="EntryTrackingRequest">
                <complexContent>
                    <extension base="impl:TrackingRequest">
                        <sequence>
                            <element name="targetLocation" nillable="true" type="xsd:string"/>
                            <any processContents="lax" minOccurs="0" maxOccurs="unbounded"/>
                        </sequence>
                    </extension>
                </complexContent>
            </complexType>
            <complexType name="TrackingResponse">
                <sequence>
                    <element name="status" type="xsd:int"/>
```

```
                <element name="tpCookies" nillable="true" type="xsd:string"/>
                <element name="errorMsg" nillable="true" type="xsd:string"/>
                <any processContents="lax" minOccurs="0" maxOccurs="unbounded"/>
            </sequence>
        </complexType>
        <complexType name="EntryTrackingResponse">
            <complexContent>
                <extension base="impl:TrackingResponse">
                    <sequence>
                        <element name="destination" nillable="true" type="xsd:string"/>
                        <any processContents="lax" minOccurs="0" maxOccurs="unbounded"/>
                    </sequence>
                </extension>
            </complexContent>
        </complexType>
    </schema>
</wsdl:types>
    <wsdl:message name="trackEntryResponse">
        <wsdl:part name="trackEntryReturn" type="intf:EntryTrackingResponse"/>
    </wsdl:message>
    <wsdl:message name="trackImpressionRequest">
        <wsdl:part name="in0" type="intf:TrackingRequest"/>
    </wsdl:message>
    <wsdl:message name="trackImpressionResponse">
        <wsdl:part name="trackImpressionReturn" type="intf:TrackingResponse"/>
    </wsdl:message>
    <wsdl:message name="trackEntryRequest">
        <wsdl:part name="in0" type="intf:EntryTrackingRequest"/>
    </wsdl:message>
    <wsdl:portType name="TrackingService">
        <wsdl:operation name="trackEntry" parameterOrder="in0">
            <wsdl:input message="intf:trackEntryRequest" name="trackEntryRequest"/>
            <wsdl:output message="intf:trackEntryResponse" name="trackEntryResponse"/>
        </wsdl:operation>
        <wsdl:operation name="trackImpression" parameterOrder="in0">
            <wsdl:input message="intf:trackImpressionRequest" name="trackImpressionRequest"/>
            <wsdl:output message="intf:trackImpressionResponse" name="trackImpressionResponse"/>
        </wsdl:operation>
    </wsdl:portType>
    <wsdl:binding name="TrackingSoapBinding" type="intf:TrackingService">
        <wsdlsoap:binding style="rpc" transport="http://schemas.xmlsoap.org/soap/http"/>
        <wsdl:operation name="trackEntry">
            <wsdlsoap:operation soapAction=""/>
            <wsdl:input name="trackEntryRequest">
                <wsdlsoap:body encodingStyle="http://schemas.xmlsoap.org/soap/encoding/" namespace="urn:TrackingService:1.0" use="encoded"/>
            </wsdl:input>
            <wsdl:output name="trackEntryResponse">
                <wsdlsoap:body encodingStyle="http://schemas.xmlsoap.org/soap/encoding/" namespace="urn:TrackingService:1.0" use="encoded"/>
            </wsdl:output>
        </wsdl:operation>
        <wsdl:operation name="trackImpression">
            <wsdlsoap:operation soapAction=""/>
            <wsdl:input name="trackImpressionRequest">
                <wsdlsoap:body encodingStyle="http://schemas.xmlsoap.org/soap/encoding/" namespace="urn:TrackingService:1.0" use="encoded"/>
            </wsdl:input>
            <wsdl:output name="trackImpressionResponse">
                <wsdlsoap:body encodingStyle="http://schemas.xmlsoap.org/soap/encoding/" namespace="urn:TrackingService:1.0" use="encoded"/>
            </wsdl:output>
        </wsdl:operation>
    </wsdl:binding>
    <wsdl:service name="TrackingServiceService">
        <wsdl:port binding="intf:TrackingSoapBinding" name="Tracking">
            <wsdlsoap:address location="http://localhost:8080/ws/websvc/Tracking"/>
        </wsdl:port>
    </wsdl:service>
</wsdl:definitions>
```

SearchEngine URL Patterns

The natural search patterns are stored as regular expressions. Examples are provided below.

"^http://a9\.com/.*"
"^http://altavista\.advalvas\.be/av2/.*"
"^http://arianna\.libero\.it/.*"
"^http://at\.altavista\.com/.*"
"^http://au\.altavista\.com/.*"
"^http://www\.yisou\.com/search.*"
"^http://www\.zoek\.nl/.*"
"^http://www\.zoeken\.nl/.*"
"^http://www2\.yatv\.com/.*"
"^http://yellow\.advalvas\.be/av2/scripts/YellowSearch\.dll.*"

ROI Tags

Below is an example list of tracking partner external ROI tags that may be replicated as roverroi commands.

- - -
Mediaplex US tags
- - -
Mediaplex External
(1,1,0,1,'https://$$($$F10,$$F10,adfarm.mediaplex.com/ad/bk/)$$($$F8,$$F8,711-518-1801-0)?Reg=1&mpuid=$$($$D1,$1,);0', sysdate, sysdate);
(2,1,0,2,'https://$$($$F10,$$F10,adfarm.mediaplex.com/ad/bk/)$$($$F8,$$F8,711-518-1801-0)?Conf=1&mpuid=$$($$D1,$1,);0', sysdate, sysdate);
(3,1,0,3,'https://$$($$F10,$$F10,adfarm.mediaplex.com/ad/bk/)$$($$F8,$$F8,711-518-1801-0)?Bid=1$$($$D3,&Bid-$3=1,)&mpuid=$$($$D1,$1,);$$($$D2,$2)', sysdate, sysdate);
(4,1,0,4,'https://$$($$F10,$$F10,adfarm.mediaplex.com/ad/bk/)$$($$F8,$$F8,711-518-1801-0)?Sell=1$$($$D3,&Sell-$3=1,)&mpuid=$$($$D1,$1,);$$($$D2,)', sysdate, sysdate);
(5,1,0,5,'https://$$($$F10,$$F10,adfarm.mediaplex.com/ad/bk/)$$($$F8,$$F8,711-518-1801-8)?BIN-ABIN=1$$($$D3,&BIN-ABIN-$3=1,)&mpuid=$$($$D1,$1,);$$($$D2,$2,)', sysdate, sysdate);
(6,1,0,6,'https://$$($$F10,$$F10,adfarm.mediaplex.com/ad/bk/)$$($$F8,$$F8,711-518-1801-6)?BIN-FP=1$$($$D3,&BIN-FP-$3=1,)&mpuid=$$($$D1,$1,);$$($$D2,$2,)', sysdate, sysdate);
(7,1,0,7,'https://$$($$F10,$$F10,adfarm.mediaplex.com/ad/bk/)$$($$F8,$$F8,711-518-1801-10)?BIN-Store=1$$($$D3,&BIN-Store-$3=1,)&mpuid=$$($$D1,$1,);$$($$D2,$2,)', sysdate, sysdate);
(8,1,0,8,'https://$$($$F10,$$F10,adfarm.mediaplex.com/ad/bk/)$$($$F8,$$F8,711-518-1801-6)?Sell-BIN=1$$($$D3,&Sell-BIN-$3=1,)&mpuid=$$($$D1,$1,);$$($$D2,$2,)', sysdate, sysdate);
(9,1,0,9,'https://$$($$F10,$$F10,adfarm.mediaplex.com/ad/bk/)$$($$F8,$$F8,711-518-1801-4)?Store-Build-Conf=1&mpuid=$$($$D1,$1,);0', sysdate, sysdate).

Advertising Server Interface

In an example embodiment, all the calls to an advertising server, such as Mediaplex, are made from a publication system server. The general configuration is depicted in FIG. 9.

As shown in FIG. 9, requests from publication system clients 910 are processed by various publication system commands 912. To make tracking requests to an advertising server 916, such as Mediaplex, these commands invoke an internal Web Service 914. The internal Web Service 914 takes as input all the necessary information to simulate the invocation as if it came directly from the client 910. This information includes the following from the original client request.

the referring URL,
the user agent string (User-Agent header),
the remote IP address,
the language preference (Accept-Language header),
any values for the svid and mojo1 cookies previously stored on behalf of Mediaplex in the publication system domain.

The publication system's Web Service 914 may make simulate a request from the client browser 910 for the calls to an advertising server 916, such as Mediaplex, by using existing HTTP headers and parameters to convey information. The requests may use HTTP 1.0 protocol. Specifically, chunked encoded responses are not expected. All parameters values are URL-encoded as necessary and standard parameter syntax is used, i.e. name=value pairs separated by & (ampersand).

There are two main types of calls supported in an example embodiment, entry tracking and ROI tracking; each is explained in more detail below.

General Request Headers Sent

Each HTTP request to an advertising server 916, such as Mediaplex, may include the following headers, as appropriate.

X-Rover-Version

This header is added to clearly identify the request as being a publication system Rover request rather than one from an end-user's browser. The value may be a version number of the following example form.

<major-release>.<minor-release>[.<maintenance-level>]

The maintenance-level is optional. Initially the value may be 1.0

Example:
X-Rover-Version: 1.0

Accept-Language

The Accept-Language header passed from the client's browser to the publication system may be propagated to an advertising server 916, such as Mediaplex, through the use of the same header.

Example:
Accept-Language: en-us

Host

The host name of the targeted an advertising server 916, such as Mediaplex, server may be supplied as a Host: header value.

Example:
Host: adfarm.mediaplex.com

Referrer

The referrer passed to the publication system, if any, may be propagated to Mediaplex as the Referrer header. If no referrer is passed to the publication system, then none may be passed to Mediaplex.

Example:
Referrer: http://offer.ebay.com/ws/eBayISAPI.dll

User-Agent

The user agent string passed to the publication system, if any, may be propagated to Mediaplex as the User-Agent header. If no user agent string is passed to the publication system, then none may be passed to Mediaplex.

Example:
User-Agent: Mozilla/4.0 (compatible; . . . )

Connection

To conserve the time required to establish TCP/IP socket connections to the Mediaplex servers, connections may be pooled and the request may employ keep-alive to manage their life cycle. By default, the Rover Web Server may discard socket connections after 10 seconds or 50 uses whichever comes first. Although, these values can be overridden by the server as described below.

Example:
Connection: Keep-Alive

Cookie

Requests that Rover sends to Mediaplex may have at most two cookies.

Example:
Cookie: svid=nnnnnnnn; mojo1= . . .

X-Forwarded-For

Since Rover is essentially proxying the request for Mediaplex, the publication system may adopt the convention of sending an X-Forwarded-For: header with the remote IP address of the client. The X-Forwarded-For: header is a non-standard, widely used header that was introduced by the Squid proxy (see [4]). If the incoming request to the publication system already has an X-Forwarded-For: header, Rover may add the client remote IP address to the end as part of a comma-separated list. If there is no X-Forwarded-For header on the incoming request, then Rover may include one on the request that just has the remote IP address of the incoming request.

Example:
X-Forwarded-For: 128.138.243.150, unknown, 192.52.106.30

X-Forwarded-Host

Since Rover is essentially proxying the request for Mediaplex, the publication system may adopt the convention of sending an X-Forwarded-Host: header with the host name of the server in the original client request. This may come with the Host: header passed by the client. If there is no Host: header on the incoming request, then Rover may use a publication system domain as the value for the X-Forwarded-Host: header.

Example:
X-Forwarded-Host: rover.ebay.com

X-Mediaplex-Redirect-Type

Mediaplex can implement a redirect in a number of ways. A proxy server like Rover may wish to receive the indication in a specific way to allow further processing. To support flexibility on both sides of the interface, Mediaplex may recognize a new request header called X-Mediaplex-Redirect-Type. This header can take three possible values:

Permanent
  The redirect may be indicated by a 301 response code and the target passed in a Location: header.
Temporary
  The redirect may be indicated by a 302 response code and the target passed in a Location: header.
CT-Wrap
  The redirect may be done via HTML (either as a meta-refresh element or in JavaScript or both) that is returned with a status code of 200.

General Response Headers Processed

In addition to the general status requests, the following response headers may be processed.

Keep-Alive

The Rover Web Service client may process the Keep-Alive response header to adjust the lifespan of connected sockets to Mediaplex. As noted above, Rover may attempt to keep the connection on a socket to Mediaplex open for a limited time span and number of requests to amortize the overhead of establishing the connection. By default this may be for 10 seconds or 50 requests, whichever comes first. However, the Mediaplex server can modify this behavior by sending a Keep-Alive header.

As described herein, the Keep-Alive header can pass back parameters to adjust the lifespan of a connection. The parameters that Rover may honor are shown below in an example embodiment.

| Parameter Name | Description |
| --- | --- |
| timeout | Max number of seconds to hold the connection open |
| max | The maximum number of HTTP requests to send over the connection |

Rover may use the more restrictive value for both parameters between its internal default and the values returned in a response.

Example:
Keep-Alive: timeout=10, max=50

Location

In the event of status 302 (moved temporarily) or 301 (moved permanently) responses from entry tracking requests, the Location header may be used to send the redirect back to the original client.

Example:
Location: http://music.listings.ebay.com/

Set-Cookie

Responses from Mediaplex may send values for the svid and mojo1 cookies. Set-Cookie headers for these cookies, and only these named cookies, may be interpreted to obtain values for these cookies. The values may be stored on behalf of Mediaplex for the external client that initiated the request. If cookies are used to accomplish this, they may be in the publication system-controlled domains. The value for these cookies may be provided when a subsequent request is made as described above.

In general, the "other attributes" of the Set-Cookie header (besides name and value) are ignored. The exception is that an expires=attribute with a date in the past may cause the cookie to be deleted from its publication system-managed storage. The values stored for these cookies may have strict length limits

| Cookie | Value Length Limit |
| --- | --- |
| svid | 20 |
| mojo1 | 100 |

Examples:
Set-Cookie: svid=22835128718; . . . other attributes
Set-Cookie: mojo1=xxxxxxxxx; . . . other attributes Entry Tracking These types of calls can be for affiliate entry, paid-search entry or natural search entry.

Affiliate Entry

In most cases, a call to an affiliate payment server (e.g. Commission Junction or CJ) is used to properly credit an affiliate for a transaction. This type of call replaces the current affiliate payment server/advertising server (e.g. CJ/Mediaplex) redirect chain. That is, where the current scheme begins with a call to:
  http://www.anrdoezrs.net/click- . . . ?loc= . . . .
and then to
  http://www.apmebf.com/ . . . .
and then to
  http://www.qksrv.net/ . . . .
and then to
  http://adfarm.mediaplex.com/ad/ck/ . . . .

The publication system Rover Web Service may make just one call to: http://adfarm.mediaplex.com/ad/ck/ . . . . with the expectation that the advertising server (e.g. Mediaplex) may internally make a call to an affiliate payment server (e.g. CJ) as necessary. That call may have the following form:
   Host: adfarm.mediaplex.com
   Port: 80
   URI: /ad/ck/rotation-id
   e.g. /ad/ck/711-1751-2978-71
   Parms:
   AID CJ campaign id
   e.g. 5463217
   PID CJ partner id
   e.g. 123456
   mpre target location
   e.g. http://music.listings.ebay.com/
Example: (Line Breaks for Readability)
   http://adfarm.mediaplex.com/ad/ck/711-1751-2978-71?
   AID=5463217&
   PID=123456&
   mpre=http%3A%2F%2Fmusic.listings.ebay.com%2F
Expected Result:
   Status code: 200
   tracking ok, should redirect to mpre=
   Status code: 301 or 302
   tracking ok, should redirect to supplied Location: response header
   Other status codes:
   indicate error and may be logged Note that the response of this command may be different than the existing /ad/ck/ commands; because, it may not be desirable to redirect to the existing RedirectEnter publication system command.

Paid-Search Entry

This type of entry is from clicking on ad placements that lead to the publication system. These types of entries have a form shown in the following example.
   Host: adfarm.mediaplex.com
   Port: 80
   URI: /ad/ck/rotation-id
   e.g. /ad/ck/711-30798-1039-12
   Parms:
   mpt cache busting string
   e.g. 1127524981627
Example: (Line Breaks for Readability)
   http://adfarm.mediaplex.com/ad/ck/711-30798-1039-12?
   mpt=1127524981627&
   ck=93
Expected Result:
   Status code: 200
   tracking ok, should redirect to loc=if present or to default site address
   if not redirected and no loc=provided, then this is a warning condition.
   Status code: 301 or 302
   tracking ok, should redirect to supplied Location: response header
   Other status codes:
   indicate error and may be logged Natural Search Entry Natural search entry can be detected on any page served by the publication system. JavaScript running on the page accomplishes this. For this use case, the context diagram looks slightly different as shown in FIG. 10.

In this case, the referrer passed may be the URL of the search engine page and not the URL of the page running the detecting JavaScript. This type of entry has the form shown in the following example.
   Host: adfarm.mediaplex.com
   Port: 80
   URI: /ad/lt/rotation-id
   e.g. /ad/lt/711-13271-9788-0
   Parameters:
   mpt cache busting string
   e.g. 1127524981627
   mpcl landing page
   e.g. http://collectibles.listings.ebay.com/ . . . .
   mpvl search page URL
   e.g. http://www.google.com/search . . . .
Example: (Line Breaks for Readability)
   http://adfarm.mediaplex.com/ad/lt/711-13271-9788-0?
   mpt=1127524981627&
   mpcl=http%3A//collectibles.listings.ebay.com . . . &
   mpvl=http%3A//www.google.com/search . . . .
Expected Result:
   Status code: 200
   tracking ok, any returned .gif is ignored
   Other status codes:
   indicate error and may be logged ROI Tracking ROI calls to the advertising server (e.g. Mediaplex) have widely varying parameters for different transaction types. The calls, however, look like the example shown below.
   Host: adfarm.mediaplex.com
   Port: 80
   URI: /ad/bk/rotation-id
   e.g. bk/711-518-1801-6
   Parameters:
   Vary by transaction type.
Example: (Line Breaks for Readability)
   http://adfarm.mediaplex.com/ad/bk/711-518-1801-6?
   BIN-FP=1&
   BIN-FP-11233=1&
   mpuid=2577082;4735966129
Expected Result:
   Status code: 200
   tracking ok, any returned .gif is ignored
   Other status codes:
   indicate error and may be logged Unlike Natural Search entries, the referring URL from the client is not passed through to the advertising server (e.g. Mediaplex) for ROI events. Also, although the existing ROI events are sent as https:// requests, the ROI tags sent from Rover would be using the HTTP protocol.

FIGS. 11-16 illustrate various conventional tracking systems as compared with the corresponding improved tracking system architectures supported in the various embodiments described herein. A conventional system for affiliate link entry is shown in FIG. 11. FIG. 12 illustrates a corresponding improved tracking system architecture supporting affiliate link entry as described herein in various example embodiments. A conventional system for paid search entry is shown in FIG. 13. FIG. 14 illustrates a corresponding improved tracking system architecture supporting paid search entry as described herein in various example embodiments. A conventional system for natural search entry is shown in FIG. 15. FIG. 16 illustrates a corresponding improved tracking system architecture supporting natural search entry as described herein in various example embodiments.

FIG. 17 illustrates a further comparison of the conventional tracking methodologies in relation to the improved tracking methodologies described herein in various example embodiments.

FIG. 18 shows a diagrammatic representation of a machine in the example form of a computer system 200 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
publishing content on a publisher website;
receiving a tracking event from a client at the publisher website, the tracking event corresponding to user activity on the publisher website;
recognizing, by use of a processor, tracking specific parameters in the tracking event;
generating a tracking entry corresponding to the tracking event;
generating a simulated request to simulate a request made from the client directly to an advertising server as a result of the tracking event, the simulated request including the tracking entry;
using a tracking service interface to send the simulated request including the tracking entry from the publisher website to the advertising server, the tracking service interface using Uniform Resource Locator (URL)-encoded parameters to convey the tracking entry, the URL-encoded parameters including a tracking partner identifier and a target location identifier;
using the tracking entry to credit a tracking partner corresponding to the tracking partner identifier for the user activity on the publisher website; and
redirecting the client from the publisher website to the target location corresponding to the target location identifier.

2. The method as claimed in claim 1 further including using a tracking service application programming interface (API) to send the tracking entry to a third server.

3. The method as claimed in claim 2 wherein the third server is an affiliate payment server.

4. An article of manufacture comprising a non-transitory machine-readable medium having machine executable instructions embedded thereon, which when executed by a machine, cause the machine to:
publish content on a publisher website;
receive a tracking event from a client at the publisher website, the tracking event corresponding to user activity on the publisher website;
recognize tracking specific parameters in the tracking event;
generate a tracking entry corresponding to the tracking event;
generate a simulated request to simulate a request made from the client directly to an advertising server as a result of the tracking event, the simulated request including the tracking entry;
use a tracking service interface to send the simulated request including the tracking entry from the publisher website to the advertising server, the tracking service interface using Uniform Resource Locator (URL)-encoded parameters to convey the tracking entry, the URL-encoded parameters including a tracking partner identifier and a target location identifier;
use the tracking entry to credit a tracking partner corresponding to the tracking partner identifier for the user activity on the publisher website; and
redirect the client from the publisher website to the target location corresponding to the target location identifier.

5. The article of manufacture as claimed in claim 4 further operable to use a tracking service application programming interface (API) to send the tracking entry to a third server.

6. The article of manufacture as claimed in claim 5 wherein the third server is an affiliate payment server.

7. A system comprising:
a processor;
a memory coupled to the processor to store information related to a tracking event; and
a tracking service component operably coupled with the processor and the memory, operable to publish content on a publisher website, receive a tracking event from a client at the publisher website, the tracking event corresponding to user activity on the publisher website, recognize tracking specific parameters in the tracking event, generate a tracking entry corresponding to the tracking event, generate a simulated request to simulate a request made from the client directly to an advertising server as a result of the tracking event, the simulated request including the tracking entry, use a tracking service interface to send the simulated request including the tracking entry from the publisher website to the advertising server, the tracking service interface using Uniform Resource Locator (URL)-encoded parameters to convey the tracking entry, the URL-encoded parameters including a tracking partner identifier and a target location identifier, use the tracking entry to credit a tracking partner corresponding to the tracking partner identifier for the user activity on the publisher website, and redirect the client from the publisher website to the target location corresponding to the target location identifier.

8. The system as claimed in claim 7 further operable to use a tracking service application programming interface (API) to send the tracking entry to a third server.

9. The system as claimed in claim 8 wherein the third server is an affiliate payment server.

* * * * *